US012552834B2

(12) United States Patent
Hwang et al.

(10) Patent No.: US 12,552,834 B2
(45) Date of Patent: Feb. 17, 2026

(54) SELECTIVE MENA BINDING PEPTIDES

(71) Applicant: MASSACHUSETTS INSTITUTE OF TECHNOLOGY, Cambridge, MA (US)

(72) Inventors: Theresa Hwang, Cambridge, MA (US); Amy E. Keating, Arlington, MA (US); Meucci Ilunga, Cambridge, MA (US); Sara Parker, Tucson, AZ (US); Ghassan Mouneimne, Tucson, AZ (US); Samantha Hill, Tucson, AZ (US)

(73) Assignees: MASSACHUSETTS INSTITUTE OF TECHNOLOGY, Cambridge, MA (US); ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 189 days.

(21) Appl. No.: 17/583,956

(22) Filed: Jan. 25, 2022

(65) Prior Publication Data
US 2024/0101604 A1  Mar. 28, 2024

Related U.S. Application Data

(60) Provisional application No. 63/141,395, filed on Jan. 25, 2021.

(51) Int. Cl.
*C07K 7/08* (2006.01)
*A61P 35/00* (2006.01)
*C07K 14/00* (2006.01)

(52) U.S. Cl.
CPC ............... *C07K 7/08* (2013.01); *A61P 35/00* (2018.01); *C07K 14/001* (2013.01); *C07K 2319/01* (2013.01)

(58) Field of Classification Search
None
See application file for complete search history.

(56) References Cited

U.S. PATENT DOCUMENTS

| | | |
|---|---|---|
| 5,446,090 A | 8/1995 | Harris |
| 6,348,558 B1 | 2/2002 | Harris et al. |
| 2004/0067503 A1 | 4/2004 | Tan et al. |

FOREIGN PATENT DOCUMENTS

| | | |
|---|---|---|
| WO | 9914259 A1 | 3/1999 |
| WO | 9934833 A1 | 7/1999 |

OTHER PUBLICATIONS

Nishimura et al. "Discovery and Functional Analysis of a Retinitis Pigmentosa Gene, C2ORF71" The American Journal of Human Genetics 86, 686-695, May 14, 2010) (Year: 2010).*
NCBI Reference Sequence: NP_001025054.1 (Year: 2024).*
Corral-Serrano et al. ("PCARE and WASF3 regulate ciliary F-actin assembly that is required for the initiation of photoreceptor outer segment disk formation," PNAS 2020, vol. 117, No., 18, 9922-9931 (Year: 2020).*
Damiano-Guercio , et al., "Loss of Ena/VASP interferes with lamellipodium architecture, motility and integrin-dependent adhesion", Elife, vol. 9, No. e55351, May 11, 2020, 31 pages.
Puleo , et al., "Mechanosensing during directed cell migration requires dynamic actin polymerization at focal adhesions", J Cell Biol., vol. 218, No. 12, Dec. 2, 2019, pp. 4215-4235.
Riquelme , et al., "Selectivity in subunit composition of Ena/VASP tetramers", Biosci Rep., vol. 35, No. 5: e00246, Oct. 2015, pp. 1-15.
Devi , et al., "Antibodies to poly[(2—8)-alpha-N-acetylneuraminic acid] and poly[(2—9)-alpha-N-acetylneuraminic acid] are elicited by immunization of mice with *Escherichia coli* K92 conjugates: potential vaccines for groups B and C meningococci and *E. coli* K1", Proc Natl Acad Sci U S A., vol. 88, No. 16, Aug. 15, 1991, pp. 7175-7179.
Fattom , et al., "Serum antibody response in adult volunteers elicited by injection of *Streptococcus pneumoniae* type 12F polysaccharide alone or conjugated to diphtheria toxoid", Infect Immun., vol. 58, No. 7, Jul. 1990, pp. 2309-2312.
Oudin , et al., "MENA Confers Resistance to Paclitaxel in Triple-Negative Breast Cancer", Mol Cancer Ther., vol. 16, No. 1, Jan. 2017, pp. 143-155.
Oudin , et al., "Signatures of Breast Cancer Metastasis: aMENAble to Interpretation?", Trends Cancer., vol. 3, No. 1, Jan. 2017, pp. 7-9.
Roussos , et al., "Mena deficiency delays tumor progression and decreases metastasis in polyoma middle-T transgenic mouse mammary tumors", Breast Cancer Res., vol. 3, No. 6; R101, 2010, 16 pages.
Szu , et al., "Comparative immunogenicities of Vi polysaccharide-protein conjugates composed of cholera toxin or its B subunit as a carrier bound to high- or lower-molecular-weight Vi", Infect Immun., vol. 57, No. 12, Dec. 1989, pp. 3823-3827.
Szu , et al., "Laboratory and preliminary clinical characterization of Vi capsular polysaccharide-protein conjugate vaccines", Infect Immun., vol. 62, No. 10, Oct. 1994, pp. 4440-4444.
Szu , et al., "Relation between structure and immunologic properties of the Vi capsular polysaccharide", Infect Immun., vol. 59, No. 12, Dec. 1991, pp. 4555-4561.

(Continued)

*Primary Examiner* — Christina Bradley
(74) *Attorney, Agent, or Firm* — Pabst Patent Group LLP

(57) ABSTRACT

Peptides that selectively bind ENAH (MENA) are described. The peptides are useful for treating certain cancers, such as triple negative breast cancer and for reducing resistance to taxane therapy.

5 Claims, 10 Drawing Sheets

Specification includes a Sequence Listing.

(56) References Cited

OTHER PUBLICATIONS

Szu, et al., "Vi capsular polysaccharide-protein conjugates for prevention of typhoid fever. Preparation, characterization, and immunogenicity in laboratory animals", J Exp Med., vol. 166, No. 5, Nov. 1, 1987, pp. 1510-1524.

Zhou, et al., "A general-purpose protein design framework based on mining sequence-structure relationships in known protein structures", Proc Natl Acad Sci U S A., vol. 117, No. 2, Jan. 14, 2020, pp. 1059-1068.

\* cited by examiner

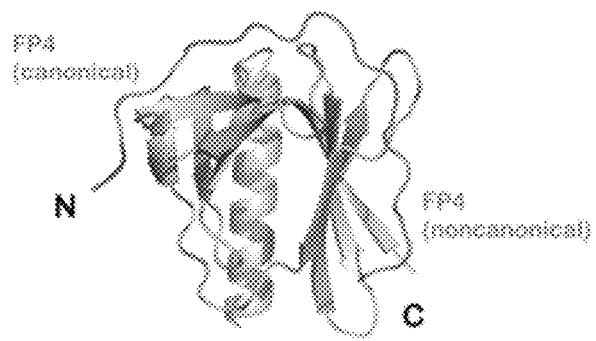 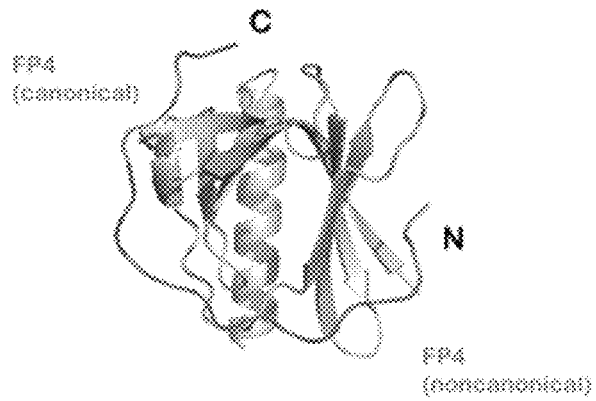
Orientation 1　　　　　　　　Orientation 2
FIGURE 9

A
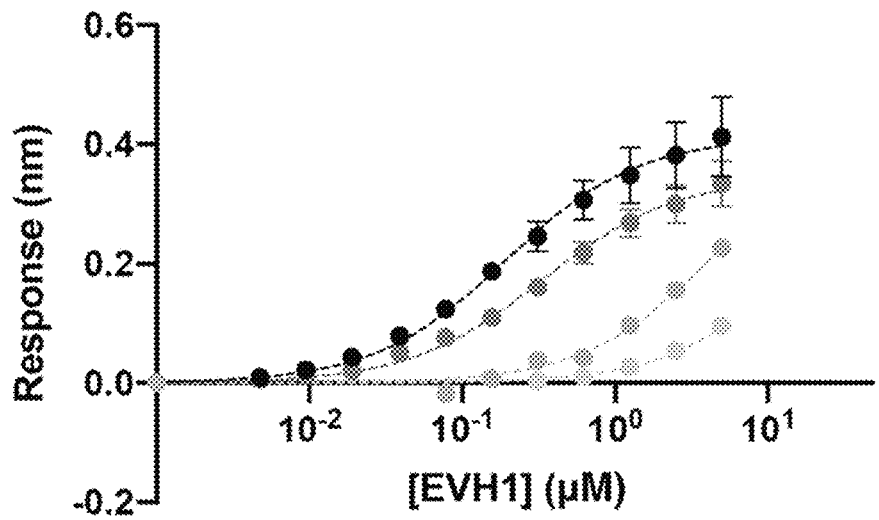
B
EVL
| Number of mutations | Residue Swaps | dTERMen score |
|---|---|---|
| 0 (Native EVL) | | 88.3 |
| 2 | P27G, M111L | 78.0 |
| 3 | P27G, Y62C, M111L | 74.9 |
| 4 | P27G, Y62C, N109E, M111L | 72.0 |
| 5 | P27G, Y62C, S101A, N109E, M111L | 69.3 |
| 6 | P27G, Y62C, V65P, S101A, N109E, M111L | 67.2 |
| 7 | I26A*, P27G, Y62C, V65P, S101A, N109E, M111L | 65.2 |
| Native ENAH | | 63.0 |
FIGURE 10A-B

```
                           SEQUENCE LISTING

<160> NUMBER OF SEQ ID NOS: 81

<210> SEQ ID NO 1
<211> LENGTH: 19
<212> TYPE: PRT
<213> ORGANISM: Homo sapiens

<400> SEQUENCE: 1

Leu Pro Pro Pro Pro Met Glu Val Leu Met Asp Lys Ser Phe Ala Ser
1               5                   10                  15

Leu Glu Ser

<210> SEQ ID NO 2
<211> LENGTH: 23
<212> TYPE: PRT
<213> ORGANISM: Homo sapiens

<400> SEQUENCE: 2

Asn Leu Glu His Leu Pro Pro Pro Met Glu Val Leu Met Asp Lys
1               5                   10                  15

Ser Phe Ala Ser Leu Glu Ser
            20

<210> SEQ ID NO 3
<211> LENGTH: 27
<212> TYPE: PRT
<213> ORGANISM: Homo sapiens

<400> SEQUENCE: 3

Glu Met Glu Gly Asn Leu Glu His Leu Pro Pro Pro Pro Met Glu Val
1               5                   10                  15

Leu Met Asp Lys Ser Phe Ala Ser Leu Glu Ser
            20                  25

<210> SEQ ID NO 4
<211> LENGTH: 33
<212> TYPE: PRT
<213> ORGANISM: Homo sapiens

<400> SEQUENCE: 4

Asn Leu Glu His Leu Pro Pro Pro Met Glu Val Leu Met Asp Lys
1               5                   10                  15

Ser Phe Ala Ser Leu Glu Ser Gly Ser Gly Ser Pro Pro Pro Pro
            20                  25                  30

Phe

<210> SEQ ID NO 5
<211> LENGTH: 31
<212> TYPE: PRT
<213> ORGANISM: Homo sapiens

<400> SEQUENCE: 5

Phe Asp Asp Phe Pro Pro Pro Pro Pro Pro Pro Val Asp Tyr Glu
```

-continued

```
             1               5                  10                 15
Asp Leu Pro Ser Ile Ser Gly Asn Phe Pro Pro Pro Pro Leu
             20                 25                 30

<210> SEQ ID NO 6
<211> LENGTH: 9
<212> TYPE: PRT
<213> ORGANISM: Homo sapiens

<400> SEQUENCE: 6

Phe Pro Pro Pro Pro Pro Pro Pro
1               5

<210> SEQ ID NO 7
<211> LENGTH: 9
<212> TYPE: PRT
<213> ORGANISM: Homo sapiens

<400> SEQUENCE: 7

Phe Pro Pro Pro Pro Ser Ser Ser Ser
1               5

<210> SEQ ID NO 8

<400> SEQUENCE: 8

000

<210> SEQ ID NO 9
<211> LENGTH: 27
<212> TYPE: PRT
<213> ORGANISM: Homo sapiens

<400> SEQUENCE: 9

Ala Asp Arg Ser Pro Phe Leu Pro Pro Pro Pro Val Thr Asp Cys
1               5                  10                 15

Ser Gln Gly Ser Pro Leu Pro His Ser Pro Val
             20                 25

<210> SEQ ID NO 10
<211> LENGTH: 25
<212> TYPE: PRT
<213> ORGANISM: Homo sapiens

<400> SEQUENCE: 10

Pro Val Thr Asp Cys Ser Gln Gly Ser Pro Leu Pro His Ser Pro Val
1               5                  10                 15

Phe Pro Pro Pro Pro Pro Glu Ala Leu
             20                 25

<210> SEQ ID NO 11
<211> LENGTH: 52
<212> TYPE: PRT
<213> ORGANISM: Homo sapiens

<400> SEQUENCE: 11

Ala Asp Arg Ser Pro Phe Leu Pro Pro Pro Pro Val Thr Asp Cys
1               5                  10                 15

Ser Gln Gly Ser Pro Leu Pro His Ser Pro Val Pro Val Thr Asp Cys
             20                 25                 30

Ser Gln Gly Ser Pro Leu Pro His Ser Pro Val Phe Pro Pro Pro Pro
             35                 40                 45
```

Pro Glu Ala Leu
    50

<210> SEQ ID NO 12

<400> SEQUENCE: 12

000

<210> SEQ ID NO 13
<211> LENGTH: 30
<212> TYPE: PRT
<213> ORGANISM: Homo sapiens

<400> SEQUENCE: 13

Gly Asp Phe Leu Pro Pro Pro Pro Pro Leu Gly Gly Gly Ser Gly
1               5                   10                  15

Ser Gly Gly Gly Ser Gly Ser Phe Pro Pro Pro Pro Leu
            20                  25                  30

<210> SEQ ID NO 14
<211> LENGTH: 29
<212> TYPE: PRT
<213> ORGANISM: Homo sapiens

<400> SEQUENCE: 14

Lys Gln Pro Gly Gly Glu Gly Asp Phe Leu Pro Pro Pro Pro Pro
1               5                   10                  15

Leu Asp Asp Ser Ser Ala Leu Pro Ser Ile Ser Gly Asn
            20                  25

<210> SEQ ID NO 15
<211> LENGTH: 22
<212> TYPE: PRT
<213> ORGANISM: Homo sapiens

<400> SEQUENCE: 15

Pro Pro Leu Asp Asp Ser Ser Ala Leu Pro Ser Ile Ser Gly Asn Phe
1               5                   10                  15

Pro Pro Pro Pro Pro Leu
            20

<210> SEQ ID NO 16
<211> LENGTH: 48
<212> TYPE: PRT
<213> ORGANISM: Homo sapiens

<400> SEQUENCE: 16

Lys Gln Pro Gly Gly Glu Gly Asp Phe Leu Pro Pro Pro Pro Pro
1               5                   10                  15

Leu Asp Asp Ser Ser Ala Leu Pro Ser Ile Ser Gly Asn Asp Asp Ser
            20                  25                  30

Ser Ala Leu Pro Ser Ile Ser Gly Asn Phe Pro Pro Pro Pro Leu
            35                  40                  45

<210> SEQ ID NO 17
<211> LENGTH: 29
<212> TYPE: PRT
<213> ORGANISM: Homo sapiens

<400> SEQUENCE: 17

Asp Phe Leu Pro Pro Pro Pro Gly Gly Gly Gly Gly Ser Gly Ser
1               5                   10                  15

```
Gly Gly Gly Ser Gly Ser Phe Pro Pro Pro Gly Gly
            20                  25
```

<210> SEQ ID NO 18
<211> LENGTH: 36
<212> TYPE: PRT
<213> ORGANISM: Homo sapiens

<400> SEQUENCE: 18

```
Ala Ala Lys Ser Glu Glu Leu Ser Cys Glu Met Glu Gly Asn Leu Glu
1               5                   10                  15

His Leu Pro Pro Pro Met Glu Val Leu Met Asp Lys Ser Phe Ala
            20                  25                  30

Ser Leu Glu Ser
            35
```

<210> SEQ ID NO 19
<211> LENGTH: 36
<212> TYPE: PRT
<213> ORGANISM: Homo sapiens

<400> SEQUENCE: 19

```
Phe Asp Asp Phe Pro Pro Pro Pro Pro Pro Val Asp Tyr Glu
1               5                   10                  15

Asp Glu Glu Ala Ala Val Val Gln Tyr Asn Asp Pro Tyr Ala Asp Gly
            20                  25                  30

Asp Pro Ala Trp
            35
```

<210> SEQ ID NO 20
<211> LENGTH: 36
<212> TYPE: PRT
<213> ORGANISM: Homo sapiens

<400> SEQUENCE: 20

```
Lys Gln Pro Gly Gly Glu Gly Asp Phe Leu Pro Pro Pro Pro Pro
1               5                   10                  15

Leu Asp Asp Ser Ser Ala Leu Pro Ser Ile Ser Gly Asn Phe Pro Pro
            20                  25                  30

Pro Pro Pro Leu
            35
```

<210> SEQ ID NO 21
<211> LENGTH: 36
<212> TYPE: PRT
<213> ORGANISM: Homo sapiens

<400> SEQUENCE: 21

```
Ala Leu Gly Gly Ala Phe Pro Pro Pro Pro Pro Ile Glu Glu Ser
1               5                   10                  15

Phe Pro Pro Ala Pro Leu Glu Glu Ile Phe Pro Ser Pro Pro Pro
            20                  25                  30

Pro Pro Glu Glu
            35
```

<210> SEQ ID NO 22
<211> LENGTH: 36
<212> TYPE: PRT
<213> ORGANISM: Homo sapiens

<400> SEQUENCE: 22

-continued

Gly Phe Asn Ala Pro Ala Thr Ser Glu Pro Ser Ser Phe Glu Phe Pro
1               5                   10                  15

Pro Pro Pro Thr Glu Asp Glu Leu Glu Ile Ile Arg Glu Thr Ala Ser
            20                  25                  30

Ser Leu Asp Ser
            35

<210> SEQ ID NO 23
<211> LENGTH: 36
<212> TYPE: PRT
<213> ORGANISM: Homo sapiens

<400> SEQUENCE: 23

Ala Asp Arg Ser Pro Phe Leu Pro Pro Pro Pro Val Thr Asp Cys
1               5                   10                  15

Ser Gln Gly Ser Pro Leu Pro His Ser Pro Val Phe Pro Pro Pro
            20                  25                  30

Pro Glu Ala Leu
            35

<210> SEQ ID NO 24
<211> LENGTH: 36
<212> TYPE: PRT
<213> ORGANISM: Homo sapiens

<400> SEQUENCE: 24

Val Tyr Ser Met Asp Asp Phe Pro Pro Pro Pro His Thr Val Cys
1               5                   10                  15

Glu Ala Gln Leu Asp Ser Glu Asp Pro Glu Gly Pro Arg Pro Ser Phe
            20                  25                  30

Asn Lys Leu Ser
            35

<210> SEQ ID NO 25
<211> LENGTH: 36
<212> TYPE: PRT
<213> ORGANISM: Homo sapiens

<400> SEQUENCE: 25

Ser Pro Pro Pro Pro Asp Glu Glu Leu Pro Leu Pro Leu Asp Leu Pro
1               5                   10                  15

Pro Pro Pro Pro Leu Asp Gly Asp Gly Leu Gly Leu Pro Pro Pro
            20                  25                  30

Pro Gly Phe Gly
            35

<210> SEQ ID NO 26
<211> LENGTH: 36
<212> TYPE: PRT
<213> ORGANISM: Homo sapiens

<400> SEQUENCE: 26

Pro Pro Ala Pro Glu Glu Gln Asp Leu Ser Met Ala Asp Phe Pro Pro
1               5                   10                  15

Pro Glu Glu Ala Phe Phe Ser Val Ala Ser Pro Glu Pro Ala Gly Pro
            20                  25                  30

Ser Gly Ser Pro
            35

```
<210> SEQ ID NO 27
<211> LENGTH: 36
<212> TYPE: PRT
<213> ORGANISM: Homo sapiens

<400> SEQUENCE: 27

Pro Pro Val Leu Asp Gly Glu Asp Val Leu Pro Asp Leu Asp Leu Leu
1               5                   10                  15

Pro Pro Pro Pro Pro Pro Pro Val Leu Leu Pro Ser Glu Glu Glu
            20                  25                  30

Ala Pro Ala Pro
        35

<210> SEQ ID NO 28
<211> LENGTH: 36
<212> TYPE: PRT
<213> ORGANISM: Homo sapiens

<400> SEQUENCE: 28

Thr Pro Val Val Asp Trp Asp Ala Arg Pro Leu Pro Pro Pro Pro Ala
1               5                   10                  15

Tyr Asp Asp Val Ala Gln Asp Glu Asp Phe Glu Ile Cys Ser Ile
            20                  25                  30

Asn Ser Thr Leu
        35

<210> SEQ ID NO 29
<211> LENGTH: 36
<212> TYPE: PRT
<213> ORGANISM: Homo sapiens

<400> SEQUENCE: 29

Pro Glu Glu Glu Leu Pro Leu Pro Ala Phe Glu Lys Leu Asn Pro Tyr
1               5                   10                  15

Pro Thr Pro Ser Pro Pro His Pro Leu Tyr Pro Gly Arg Arg Val Ile
            20                  25                  30

Glu Phe Ser Glu
        35

<210> SEQ ID NO 30
<211> LENGTH: 36
<212> TYPE: PRT
<213> ORGANISM: Homo sapiens

<400> SEQUENCE: 30

Ser Gly Ser Gly Gly Ile Phe Pro Pro Pro Asp Asp Asp Ile Tyr
1               5                   10                  15

Asp Gly Ile Glu Glu Glu Asp Ala Asp Asp Gly Phe Pro Ala Pro Pro
            20                  25                  30

Lys Gln Leu Asp
        35

<210> SEQ ID NO 31
<211> LENGTH: 36
<212> TYPE: PRT
<213> ORGANISM: Homo sapiens

<400> SEQUENCE: 31

Val Val Pro Val Met Ala Ala Gln Val Val Gly Gly Thr Gln Ala Cys
1               5                   10                  15

Glu Gly Gly Trp Ser Gln Gly Leu Pro Leu Pro Pro Pro Pro Pro
```

Ala Ala Gln Leu
        35

<210> SEQ ID NO 32
<211> LENGTH: 36
<212> TYPE: PRT
<213> ORGANISM: Homo sapiens

<400> SEQUENCE: 32

Ser Val Pro Pro Pro Pro Leu Pro Pro Pro Pro Ile Lys Gly
1               5                   10                  15

Pro Phe Pro Pro Pro Pro Pro Leu Pro Leu Ala Ala Pro Leu Pro His
            20                  25                  30

Ser Val Pro Asp
        35

<210> SEQ ID NO 33
<211> LENGTH: 36
<212> TYPE: PRT
<213> ORGANISM: Homo sapiens

<400> SEQUENCE: 33

Lys Ser Pro Ile Ala Asp Phe Pro Ala Pro Pro Pro Tyr Ser Ala Val
1               5                   10                  15

Thr Pro Pro Pro Asp Ala Phe Ser Arg Gly Val Ser Ser Pro Ile Ala
            20                  25                  30

Gly Pro Ala Gln
        35

<210> SEQ ID NO 34
<211> LENGTH: 36
<212> TYPE: PRT
<213> ORGANISM: Homo sapiens

<400> SEQUENCE: 34

Gly Ser Thr Gln Asp Val Gln Ser Ser Pro His Asn Gln Phe Thr Phe
1               5                   10                  15

Arg Pro Leu Pro Pro Pro Pro Pro Pro His Ala Cys Thr Cys Ala
            20                  25                  30

Arg Lys Pro Pro
        35

<210> SEQ ID NO 35
<211> LENGTH: 36
<212> TYPE: PRT
<213> ORGANISM: Homo sapiens

<400> SEQUENCE: 35

Phe Asp Asp Phe Pro Pro Pro Pro Pro Pro Pro Val Asp Tyr Glu
1               5                   10                  15

Asp Glu Glu Ala Ala Val Val Gln Tyr Asn Asp Pro Tyr Ala Asp Gly
            20                  25                  30

Asp Pro Ala Trp
        35

<210> SEQ ID NO 36
<211> LENGTH: 22
<212> TYPE: PRT
<213> ORGANISM: Homo sapiens

```
<400> SEQUENCE: 36

Phe Asp Asp Phe Pro Pro Pro Pro Pro Pro Val Asp Tyr Glu
1               5                   10                  15

Asp Glu Glu Ala Ala Val
            20

<210> SEQ ID NO 37
<211> LENGTH: 17
<212> TYPE: PRT
<213> ORGANISM: Homo sapiens

<400> SEQUENCE: 37

Phe Asp Asp Phe Pro Pro Pro Pro Pro Pro Val Asp Tyr Glu
1               5                   10                  15

Asp

<210> SEQ ID NO 38
<211> LENGTH: 17
<212> TYPE: PRT
<213> ORGANISM: Homo sapiens

<400> SEQUENCE: 38

Phe Asp Asp Phe Pro Pro Pro Pro Pro Pro Val Ala Tyr Ala
1               5                   10                  15

Ala

<210> SEQ ID NO 39
<211> LENGTH: 12
<212> TYPE: PRT
<213> ORGANISM: Homo sapiens

<400> SEQUENCE: 39

Phe Asp Asp Phe Pro Pro Pro Pro Pro Pro
1               5                   10

<210> SEQ ID NO 40

<400> SEQUENCE: 40

000

<210> SEQ ID NO 41

<400> SEQUENCE: 41

000

<210> SEQ ID NO 42

<400> SEQUENCE: 42

000

<210> SEQ ID NO 43
<211> LENGTH: 36
<212> TYPE: PRT
<213> ORGANISM: Homo sapiens

<400> SEQUENCE: 43

Gly Phe Asn Ala Pro Ala Thr Ser Glu Pro Ser Ser Phe Glu Phe Pro
1               5                   10                  15

Pro Pro Pro Thr Glu Asp Glu Leu Glu Ile Ile Arg Glu Thr Ala Ser
            20                  25                  30
```

Ser Leu Asp Ser
        35

<210> SEQ ID NO 44

<400> SEQUENCE: 44

000

<210> SEQ ID NO 45
<211> LENGTH: 5
<212> TYPE: PRT
<213> ORGANISM: Artificial Sequence
<220> FEATURE:
<223> OTHER INFORMATION: Synthetic peptide

<400> SEQUENCE: 45

Leu Pro Pro Pro Pro
1               5

<210> SEQ ID NO 46
<211> LENGTH: 5
<212> TYPE: PRT
<213> ORGANISM: Artificial Sequence
<220> FEATURE:
<223> OTHER INFORMATION: Synthetic peptide

<400> SEQUENCE: 46

Phe Pro Pro Pro Pro
1               5

<210> SEQ ID NO 47
<211> LENGTH: 21
<212> TYPE: DNA
<213> ORGANISM: Artificial Sequence
<220> FEATURE:
<223> OTHER INFORMATION: Synthetic DNA

<400> SEQUENCE: 47
aggtcggtgt gaacggattt g                                    21

<210> SEQ ID NO 48
<211> LENGTH: 19
<212> TYPE: DNA
<213> ORGANISM: Artificial Sequence
<220> FEATURE:
<223> OTHER INFORMATION: Synthetic DNA

<400> SEQUENCE: 48
ggggtcgttg atggcaaca                                       19

<210> SEQ ID NO 49
<211> LENGTH: 20
<212> TYPE: DNA
<213> ORGANISM: Artificial Sequence
<220> FEATURE:
<223> OTHER INFORMATION: Synthetic DNA

<400> SEQUENCE: 49
tgagagccaa acggaagacc                                      20

<210> SEQ ID NO 50
<211> LENGTH: 20
<212> TYPE: DNA
<213> ORGANISM: Artificial Sequence
<220> FEATURE:

<223> OTHER INFORMATION: synthetic DNA

<400> SEQUENCE: 50
ttctggacag caacgaggac                                           20

<210> SEQ ID NO 51
<211> LENGTH: 201
<212> TYPE: PRT
<213> ORGANISM: Homo sapiens

<400> SEQUENCE: 51

Met Ser Glu Gln Ser Ile Cys Gln Ala Arg Ala Ala Val Met Val Tyr
1               5                   10                  15

Asp Asp Ala Asn Lys Lys Trp Val Pro Ala Gly Gly Ser Thr Gly Phe
            20                  25                  30

Ser Arg Val His Ile Tyr His His Thr Gly Asn Asn Thr Phe Arg Val
        35                  40                  45

Val Gly Arg Lys Ile Gln Asp His Gln Val Val Ile Asn Cys Ala Ile
    50                  55                  60

Pro Lys Gly Leu Lys Tyr Asn Gln Ala Thr Gln Thr Phe His Gln Trp
65                  70                  75                  80

Arg Asp Ala Arg Gln Val Tyr Gly Leu Asn Phe Gly Ser Lys Glu Asp
                85                  90                  95

Ala Asn Val Phe Ala Ser Ala Met Met His Ala Leu Glu Val Leu Asn
            100                 105                 110

Ser Gln Glu Ala Gly Gly Gly Gly Gly Ser Ala Cys Glu Gly
            115                 120                 125

Leu Asp Tyr Asp Arg Leu Lys Gln Asp Ile Leu Asp Glu Met Arg Lys
    130                 135                 140

Glu Leu Ala Lys Leu Lys Glu Glu Leu Ile Asp Ala Ile Arg Gln Glu
145                 150                 155                 160

Leu Ser Lys Ser Asn Thr Ala Gly Ser Gly Ser Gly Ser Gly Leu Asn
                165                 170                 175

Asp Ile Phe Glu Ala Gln Lys Ile Glu Trp His Glu Asp Thr Gly Gly
            180                 185                 190

Ser Ser His His His His His Gly
            195                 200

<210> SEQ ID NO 52
<211> LENGTH: 201
<212> TYPE: PRT
<213> ORGANISM: Homo sapiens

<400> SEQUENCE: 52

Met Ser Glu Gln Ser Ile Ala Gln Ala Arg Ala Ala Val Met Val Tyr
1               5                   10                  15

Asp Asp Ala Asn Lys Lys Trp Val Pro Ala Gly Gly Ser Thr Gly Phe
            20                  25                  30

Ser Arg Val His Ile Tyr His His Thr Gly Asn Asn Thr Phe Arg Val
        35                  40                  45

Val Gly Arg Lys Ile Gln Asp His Gln Val Val Ile Asn Ser Ala Ile
    50                  55                  60

Pro Lys Gly Leu Lys Tyr Asn Gln Ala Thr Gln Thr Phe His Gln Trp
65                  70                  75                  80

Arg Asp Ala Arg Gln Val Tyr Gly Leu Asn Phe Gly Ser Lys Glu Asp
                85                  90                  95

```
Ala Asn Val Phe Ala Ser Ala Met Met His Ala Leu Glu Val Leu Asn
                100                 105                 110

Ser Gln Glu Ala Gly Gly Gly Gly Gly Ser Ala Ser Glu Gly
        115                 120                 125

Leu Asp Tyr Asp Arg Leu Lys Gln Asp Ile Leu Asp Glu Met Arg Lys
    130                 135                 140

Glu Leu Ala Lys Leu Lys Glu Leu Ile Asp Ala Ile Arg Gln Glu
145                 150                 155                 160

Leu Ser Lys Ser Asn Thr Ala Gly Ser Gly Ser Gly Ser Gly Leu Asn
                165                 170                 175

Asp Ile Phe Glu Ala Gln Lys Ile Glu Trp His Glu Asp Thr Gly Gly
                180                 185                 190

Ser Ser His His His His His His Gly
        195                 200

<210> SEQ ID NO 53
<211> LENGTH: 132
<212> TYPE: PRT
<213> ORGANISM: Homo sapiens

<400> SEQUENCE: 53

Met Ala Gly Gly Leu Asn Asp Ile Phe Glu Ala Gln Lys Ile Glu Trp
1               5                   10                  15

His Glu Asp Thr Gly Gly Ser Ser His His His His His His Gly Ser
                20                  25                  30

Gly Ser Gly Ser Asp Ser Glu Val Asn Gln Glu Ala Lys Pro Glu Val
            35                  40                  45

Lys Pro Glu Val Lys Pro Glu Thr His Ile Asn Leu Lys Val Ser Asp
    50                  55                  60

Gly Ser Ser Glu Ile Phe Phe Lys Ile Lys Lys Thr Thr Pro Leu Arg
65                  70                  75                  80

Arg Leu Met Glu Ala Phe Ala Lys Arg Gln Gly Lys Glu Met Asp Ser
                85                  90                  95

Leu Thr Phe Leu Tyr Asp Gly Ile Glu Ile Gln Ala Asp Gln Thr Pro
                100                 105                 110

Glu Asp Leu Asp Met Glu Asp Asn Asp Ile Ile Glu Ala His Arg Glu
            115                 120                 125

Gln Ile Gly Gly
        130

<210> SEQ ID NO 54
<211> LENGTH: 168
<212> TYPE: PRT
<213> ORGANISM: Homo sapiens

<400> SEQUENCE: 54

Met Ala Gly Gly Leu Asn Asp Ile Phe Glu Ala Gln Lys Ile Glu Trp
1               5                   10                  15

His Glu Asp Thr Gly Gly Ser Ser His His His His His His Gly Ser
                20                  25                  30

Gly Ser Gly Ser Asp Ser Glu Val Asn Gln Glu Ala Lys Pro Glu Val
            35                  40                  45

Lys Pro Glu Val Lys Pro Glu Thr His Ile Asn Leu Lys Val Ser Asp
    50                  55                  60

Gly Ser Ser Glu Ile Phe Phe Lys Ile Lys Lys Thr Thr Pro Leu Arg
65                  70                  75                  80
```

```
Arg Leu Met Glu Ala Phe Ala Lys Arg Gln Gly Lys Glu Met Asp Ser
                85                  90                  95

Leu Thr Phe Leu Tyr Asp Gly Ile Glu Ile Gln Ala Asp Gln Thr Pro
            100                 105                 110

Glu Asp Leu Asp Met Glu Asp Asn Asp Ile Ile Glu Ala His Arg Glu
        115                 120                 125

Gln Ile Gly Gly Gly Phe Asn Ala Pro Ala Thr Ser Glu Pro Ser Ser
    130                 135                 140

Phe Glu Phe Pro Pro Pro Thr Glu Asp Glu Leu Glu Ile Ile Arg
145                 150                 155                 160

Glu Thr Ala Ser Ser Leu Asp Ser
                165

<210> SEQ ID NO 55
<211> LENGTH: 136
<212> TYPE: PRT
<213> ORGANISM: Artificial Sequence
<220> FEATURE:
<223> OTHER INFORMATION: synthetic construct

<400> SEQUENCE: 55

Met Ala Gly Gly Leu Asn Asp Ile Phe Glu Ala Gln Lys Ile Glu Trp
1               5                   10                  15

His Glu Asp Thr Gly Gly Ser Ser His His His His His His Gly Ser
            20                  25                  30

Gly Ser Gly Ser Asp Ser Glu Val Asn Gln Glu Ala Lys Pro Glu Val
        35                  40                  45

Lys Pro Glu Val Lys Pro Glu Thr His Ile Asn Leu Lys Val Ser Asp
    50                  55                  60

Gly Ser Ser Glu Ile Phe Phe Lys Ile Lys Lys Thr Thr Pro Leu Arg
65                  70                  75                  80

Arg Leu Met Glu Ala Phe Ala Lys Arg Gln Gly Lys Glu Met Asp Ser
                85                  90                  95

Leu Thr Phe Leu Tyr Asp Gly Ile Glu Ile Gln Ala Asp Gln Thr Pro
            100                 105                 110

Glu Asp Leu Asp Met Glu Asp Asn Asp Ile Ile Glu Ala His Arg Glu
        115                 120                 125

Gln Ile Gly Gly Ser Gly Ser Gly
    130                 135

<210> SEQ ID NO 56
<211> LENGTH: 135
<212> TYPE: PRT
<213> ORGANISM: Homo sapiens

<400> SEQUENCE: 56

Met His His His His His His Ser Ser Gly Val Asp Leu Gly Thr Glu
1               5                   10                  15

Asn Leu Tyr Phe Gln Ser Asn Ala Met Ser Glu Gln Ser Ile Cys Gln
            20                  25                  30

Ala Arg Ala Ala Val Met Val Tyr Asp Asp Ala Asn Lys Lys Trp Val
        35                  40                  45

Pro Ala Gly Gly Ser Thr Gly Phe Ser Arg Val His Ile Tyr His His
    50                  55                  60

Thr Gly Asn Asn Thr Phe Arg Val Val Gly Arg Lys Ile Gln Asp His
65                  70                  75                  80

Gln Val Val Ile Asn Cys Ala Ile Pro Lys Gly Leu Lys Tyr Asn Gln
```

```
                85                  90                  95
Ala Thr Gln Thr Phe His Gln Trp Arg Asp Ala Arg Gln Val Tyr Gly
            100                 105                 110

Leu Asn Phe Gly Ser Lys Glu Asp Ala Asn Val Phe Ala Ser Ala Met
        115                 120                 125

Met His Ala Leu Glu Val Leu
    130                 135
```

<210> SEQ ID NO 57
<211> LENGTH: 138
<212> TYPE: PRT
<213> ORGANISM: Homo sapiens

<400> SEQUENCE: 57

```
Met His His His His His Ser Ser Gly Val Asp Leu Gly Thr Glu
1               5                   10                  15

Asn Leu Tyr Phe Gln Ser Asn Ala Met Ser Glu Thr Val Ile Cys Ser
            20                  25                  30

Ser Arg Ala Thr Val Met Leu Tyr Asp Asp Gly Asn Lys Arg Trp Leu
        35                  40                  45

Pro Ala Gly Thr Gly Pro Gln Ala Phe Ser Arg Val Gln Ile Tyr His
    50                  55                  60

Asn Pro Thr Ala Asn Ser Phe Arg Val Val Gly Arg Lys Met Gln Pro
65                  70                  75                  80

Asp Gln Gln Val Val Ile Asn Cys Ala Ile Val Arg Gly Val Lys Tyr
                85                  90                  95

Asn Gln Ala Thr Pro Asn Phe His Gln Trp Arg Asp Ala Arg Gln Val
            100                 105                 110

Trp Gly Leu Asn Phe Gly Ser Lys Glu Asp Ala Ala Gln Phe Ala Ala
        115                 120                 125

Gly Met Ala Ser Ala Leu Glu Ala Leu Glu
    130                 135
```

<210> SEQ ID NO 58
<211> LENGTH: 140
<212> TYPE: PRT
<213> ORGANISM: Homo sapiens

<400> SEQUENCE: 58

```
Met His His His His His His Ser Ser Gly Val Asp Leu Gly Thr Glu
1               5                   10                  15

Asn Leu Tyr Phe Gln Ser Asn Ala Met Ser Glu Gln Ser Ile Cys Gln
            20                  25                  30

Ala Arg Ala Ser Val Met Val Tyr Asp Asp Thr Ser Lys Lys Trp Val
        35                  40                  45

Pro Ile Lys Pro Gly Gln Gln Gly Phe Ser Arg Ile Asn Ile Tyr His
    50                  55                  60

Asn Thr Ala Ser Ser Thr Phe Arg Val Val Gly Val Lys Leu Gln Asp
65                  70                  75                  80

Gln Gln Val Val Ile Asn Tyr Ser Ile Val Lys Gly Leu Lys Tyr Asn
                85                  90                  95

Gln Ala Thr Pro Thr Phe His Gln Trp Arg Asp Ala Arg Gln Val Tyr
            100                 105                 110

Gly Leu Asn Phe Ala Ser Lys Glu Glu Ala Thr Thr Phe Ser Asn Ala
        115                 120                 125

Met Leu Phe Ala Leu Asn Ile Met Asn Ser Gln Glu
    130                 135
```

```
            130             135             140
```

<210> SEQ ID NO 59
<211> LENGTH: 135
<212> TYPE: PRT
<213> ORGANISM: Homo sapiens

<400> SEQUENCE: 59

```
Met His His His His His Ser Ser Gly Val Asp Leu Gly Thr Glu
1               5                   10                  15

Asn Leu Tyr Phe Gln Ser Asn Ala Met Ser Glu Gln Ser Ile Cys Gln
            20                  25                  30

Ala Arg Ala Ser Val Met Val Tyr Asp Asp Thr Ser Lys Lys Trp Val
        35                  40                  45

Pro Ala Gly Gly Gln Gln Gly Phe Ser Arg Ile Asn Ile Tyr His Asn
    50                  55                  60

Thr Ala Ser Asn Thr Phe Arg Val Val Gly Val Lys Leu Gln Asp Gln
65                  70                  75                  80

Gln Val Val Ile Asn Cys Ser Ile Pro Lys Gly Leu Lys Tyr Asn Gln
                85                  90                  95

Ala Thr Pro Thr Phe His Gln Trp Arg Asp Ala Arg Gln Val Tyr Gly
            100                 105                 110

Leu Asn Phe Ala Ser Lys Glu Glu Ala Thr Thr Phe Ala Asn Ala Met
        115                 120                 125

Leu Phe Ala Leu Glu Ile Leu
    130                 135
```

<210> SEQ ID NO 60
<211> LENGTH: 177
<212> TYPE: PRT
<213> ORGANISM: Homo sapiens

<400> SEQUENCE: 60

```
Met His His His His His Ser Ser Gly Val Asp Leu Gly Thr Glu
1               5                   10                  15

Asn Leu Tyr Phe Gln Ser Asn Ala Met Ser Glu Gln Ser Ile Cys Gln
            20                  25                  30

Ala Arg Ala Ala Val Met Val Tyr Asp Asp Ala Asn Lys Lys Trp Val
        35                  40                  45

Pro Ala Gly Gly Ser Thr Gly Phe Ser Arg Val His Ile Tyr His His
    50                  55                  60

Thr Gly Asn Asn Thr Phe Arg Val Val Gly Arg Lys Ile Gln Asp His
65                  70                  75                  80

Gln Val Val Ile Asn Cys Ala Ile Pro Lys Gly Leu Lys Tyr Asn Gln
                85                  90                  95

Ala Thr Gln Thr Phe His Gln Trp Arg Asp Ala Arg Gln Val Tyr Gly
            100                 105                 110

Leu Asn Phe Gly Ser Lys Glu Asp Ala Asn Val Phe Ala Ser Ala Met
        115                 120                 125

Met His Ala Leu Glu Val Leu Gly Gly Ser Gly Ser Gly Phe Asp Asp
    130                 135                 140

Phe Pro Pro Pro Pro Pro Pro Val Asp Tyr Glu Asp Glu Glu
145                 150                 155                 160

Ala Ala Val Val Gln Tyr Asn Asp Pro Tyr Ala Asp Gly Asp Pro Ala
                165                 170                 175

Trp
```

<210> SEQ ID NO 61
<211> LENGTH: 177
<212> TYPE: PRT
<213> ORGANISM: Homo sapiens

<400> SEQUENCE: 61

```
Met His His His His His Ser Ser Gly Val Asp Leu Gly Thr Glu
1               5                   10                  15

Asn Leu Tyr Phe Gln Ser Asn Ala Met Ser Glu Gln Ser Ile Cys Gln
            20                  25                  30

Ala Arg Ala Ala Val Met Val Tyr Asp Asp Ala Asn Lys Lys Trp Val
        35                  40                  45

Pro Ala Gly Gly Ser Thr Gly Phe Ser Arg Val His Ile Tyr His His
    50                  55                  60

Thr Gly Asn Asn Thr Phe Arg Val Val Gly Arg Lys Ile Gln Asp His
65                  70                  75                  80

Gln Val Val Ile Asn Cys Ala Ile Pro Lys Gly Leu Lys Tyr Asn Gln
                85                  90                  95

Ala Thr Gln Thr Phe His Gln Trp Arg Asp Ala Arg Gln Val Tyr Gly
            100                 105                 110

Leu Asn Phe Gly Ser Lys Glu Asp Ala Asn Val Phe Ala Ser Ala Met
        115                 120                 125

Met His Ala Leu Glu Val Leu Gly Gly Ser Gly Ser Gly Ala Ala Lys
    130                 135                 140

Ser Glu Glu Leu Ser Cys Glu Met Glu Gly Asn Leu Glu His Leu Pro
145                 150                 155                 160

Pro Pro Pro Met Glu Val Leu Met Asp Lys Ser Phe Ala Ser Leu Glu
                165                 170                 175

Ser
```

<210> SEQ ID NO 62
<211> LENGTH: 212
<212> TYPE: PRT
<213> ORGANISM: Artificial Sequence
<220> FEATURE:
<223> OTHER INFORMATION: synthetic construct

<400> SEQUENCE: 62

```
Met Lys Lys Ile Ala Cys Leu Ser Ala Leu Ala Ala Val Leu Ala Phe
1               5                   10                  15

Thr Ala Gly Thr Ser Val Ala Gly Gly Gln Ser Gly Gln Ser Gly Asp
            20                  25                  30

Tyr Asn Lys Asn Gln Tyr Tyr Gly Ile Thr Ala Gly Pro Ala Tyr Arg
        35                  40                  45

Ile Asn Asp Trp Ala Ser Ile Tyr Gly Val Val Gly Val Gly Tyr Gly
    50                  55                  60

Lys Phe Gln Thr Thr Glu Tyr Pro Thr Tyr Lys His Asp Thr Ser Asp
65                  70                  75                  80

Tyr Gly Phe Ser Tyr Gly Ala Gly Leu Gln Phe Asn Pro Met Glu Asn
                85                  90                  95

Val Ala Leu Asp Phe Ser Tyr Glu Gln Ser Arg Ile Arg Ser Val Asp
            100                 105                 110

Val Gly Thr Trp Ile Leu Ser Val Gly Tyr Arg Phe Gly Ser Lys Ser
        115                 120                 125

Arg Arg Ala Thr Ser Thr Val Thr Gly Gly Tyr Ala Gln Ser Asp Ala
```

```
            130                 135                 140
Gln Gly Gln Met Asn Lys Met Gly Gly Phe Asn Leu Lys Tyr Arg Tyr
145                 150                 155                 160

Glu Glu Asp Asn Ser Pro Leu Gly Val Ile Gly Ser Phe Thr Tyr Thr
                165                 170                 175

Glu Lys Ser Arg Thr Ala Ser Gly Gly Ser Gly Gly Ser Asp
            180                 185                 190

Tyr Lys Asp Asp Asp Lys Gly Gly Ser Gly Gly Ser Gly
            195                 200                 205

Ile Pro Leu Arg
    210

<210> SEQ ID NO 63

<400> SEQUENCE: 63

000

<210> SEQ ID NO 64
<211> LENGTH: 36
<212> TYPE: PRT
<213> ORGANISM: Homo sapiens

<400> SEQUENCE: 64

Glu Ala Phe Gln Pro Gln Glu Pro Asp Phe Pro Pro Pro Pro Asp
1               5                   10                  15

Leu Glu Gln Leu Arg Leu Thr Asp Glu Leu Ala Pro Pro Lys Pro Pro
                20                  25                  30

Leu Pro Glu Gly
        35

<210> SEQ ID NO 65
<211> LENGTH: 36
<212> TYPE: PRT
<213> ORGANISM: Homo sapiens

<400> SEQUENCE: 65

Val Gly Glu Gly Ser Ser Ser Asp Glu Glu Ser Gly Gly Thr Leu Pro
1               5                   10                  15

Pro Pro Asp Phe Pro Pro Pro Leu Pro Asp Ser Ala Ile Phe Leu
                20                  25                  30

Pro Pro Ser Leu
        35

<210> SEQ ID NO 66
<211> LENGTH: 36
<212> TYPE: PRT
<213> ORGANISM: Homo sapiens

<400> SEQUENCE: 66

His Trp Ala Gly Leu Pro Cys Pro Cys Thr Ile Cys Gln Met Pro Pro
1               5                   10                  15

Pro Pro His Leu Ser Ala Leu Ser Thr Ala Asn Met Ala Arg Leu Ser
                20                  25                  30

Ala Glu Ser Lys
        35

<210> SEQ ID NO 67
<211> LENGTH: 36
<212> TYPE: PRT
```

<213> ORGANISM: Homo sapiens

<400> SEQUENCE: 67

Ile Leu Ser Gly Leu Pro Ala Pro Asp Phe Ile Asp Tyr Pro Glu Arg
1               5                   10                  15

Gln Glu Cys Asn Cys Arg Pro Gln Glu Ser Pro Tyr Val Ser Gly Met
            20                  25                  30

Lys Thr Cys His
        35

<210> SEQ ID NO 68
<211> LENGTH: 21
<212> TYPE: DNA
<213> ORGANISM: Artificial Sequence
<220> FEATURE:
<223> OTHER INFORMATION: synthetic construct

<400> SEQUENCE: 68
ttagaggagt ctcaacagag g                                          21

<210> SEQ ID NO 69
<211> LENGTH: 21
<212> TYPE: DNA
<213> ORGANISM: Artificial Sequence
<220> FEATURE:
<223> OTHER INFORMATION: synthetic construct

<400> SEQUENCE: 69
ttgttcattt cttccatgag g                                          21

<210> SEQ ID NO 70
<211> LENGTH: 18
<212> TYPE: PRT
<213> ORGANISM: Artificial Sequence
<220> FEATURE:
<223> OTHER INFORMATION: synthetic construct

<400> SEQUENCE: 70

Arg Ile Ala Arg Gly Ser Gly Ser Glu Gln Lys Leu Ile Ser Glu Glu
1               5                   10                  15

Asp Leu

<210> SEQ ID NO 71
<211> LENGTH: 6
<212> TYPE: PRT
<213> ORGANISM: Artificial Sequence
<220> FEATURE:
<223> OTHER INFORMATION: Synthetic contruct

<400> SEQUENCE: 71

Thr Pro Pro Ser Pro Phe
1               5

<210> SEQ ID NO 72
<211> LENGTH: 21
<212> TYPE: PRT
<213> ORGANISM: Homo sapiens

<400> SEQUENCE: 72

Glu His Leu Pro Pro Pro Met Glu Val Leu Met Asp Lys Ser Phe
1               5                   10                  15

Ala Ser Leu Glu Ser
            20

<210> SEQ ID NO 73
<211> LENGTH: 36
<212> TYPE: PRT
<213> ORGANISM: Homo sapiens

<400> SEQUENCE: 73

Leu Pro Cys Pro Cys Thr Ile Cys Gln Met Pro Pro Pro His Leu
1               5                   10                  15

Ser Ala Leu Ser Thr Ala Asn Met Ala Arg Leu Ser Ala Glu Ser Lys
            20                  25                  30

Asp Leu Leu Lys
        35

<210> SEQ ID NO 74
<211> LENGTH: 36
<212> TYPE: PRT
<213> ORGANISM: Homo sapiens

<400> SEQUENCE: 74

Leu Pro Ser Pro Cys Thr Ile Cys Gln Met Pro Pro Pro His Leu
1               5                   10                  15

Ser Ala Leu Ser Thr Ala Asn Met Ala Arg Leu Ser Ala Glu Ser Lys
            20                  25                  30

Asp Leu Leu Lys
        35

<210> SEQ ID NO 75
<211> LENGTH: 36
<212> TYPE: PRT
<213> ORGANISM: Homo sapiens

<400> SEQUENCE: 75

Leu Pro Cys Pro Ser Thr Ile Cys Gln Met Pro Pro Pro His Leu
1               5                   10                  15

Ser Ala Leu Ser Thr Ala Asn Met Ala Arg Leu Ser Ala Glu Ser Lys
            20                  25                  30

Asp Leu Leu Lys
        35

<210> SEQ ID NO 76
<211> LENGTH: 36
<212> TYPE: PRT
<213> ORGANISM: Homo sapiens

<400> SEQUENCE: 76

Leu Pro Cys Pro Cys Thr Ile Ser Gln Met Pro Pro Pro His Leu
1               5                   10                  15

Ser Ala Leu Ser Thr Ala Asn Met Ala Arg Leu Ser Ala Glu Ser Lys
            20                  25                  30

Asp Leu Leu Lys
        35

<210> SEQ ID NO 77
<211> LENGTH: 18
<212> TYPE: PRT
<213> ORGANISM: Homo sapiens

<400> SEQUENCE: 77

Asn Leu Glu His Leu Pro Pro Pro Pro Met Glu Val Leu Met Asp Lys
1               5                   10                  15

```
Ser Phe

<210> SEQ ID NO 78
<211> LENGTH: 15
<212> TYPE: PRT
<213> ORGANISM: Homo sapiens

<400> SEQUENCE: 78

Asn Leu Glu His Leu Pro Pro Pro Met Glu Val Leu Met Asp
1               5                   10                  15

<210> SEQ ID NO 79
<211> LENGTH: 16
<212> TYPE: PRT
<213> ORGANISM: Artificial Sequence
<220> FEATURE:
<223> OTHER INFORMATION: Synthetic peptide
<220> FEATURE:
<221> NAME/KEY: misc_feature
<222> LOCATION: (6)..(11)
<223> OTHER INFORMATION: Xaa can be any naturally occurring amino acid

<400> SEQUENCE: 79

Phe Pro Pro Pro Pro Xaa Xaa Xaa Xaa Xaa Xaa Phe Pro Pro Pro
1               5                   10                  15

<210> SEQ ID NO 80
<211> LENGTH: 8
<212> TYPE: PRT
<213> ORGANISM: Artificial Sequence
<220> FEATURE:
<223> OTHER INFORMATION: Synthetic peptide
<220> FEATURE:
<221> NAME/KEY: misc_feature
<222> LOCATION: (6)..(7)
<223> OTHER INFORMATION: Xaa can be any naturally occurring amino acid

<400> SEQUENCE: 80

Phe Trp Tyr Leu Pro Xaa Xaa Pro
1               5

<210> SEQ ID NO 81
<211> LENGTH: 14
<212> TYPE: PRT
<213> ORGANISM: Artificial Sequence
<220> FEATURE:
<223> OTHER INFORMATION: Synthetic peptide

<400> SEQUENCE: 81

Phe Trp Tyr Leu Pro Phe Trp Tyr Leu Ile Ala Val Pro Pro
1               5                   10
```

SELECTIVE MENA BINDING PEPTIDES

CROSS-REFERENCE TO RELATED APPLICATION

This application claims priority to U.S. Provisional Application No. 63/141,395, filed on Jan. 25, 2021. The disclosure of the prior application is considered part of and is incorporated by reference in the disclosure of this application.

STATEMENT REGARDING FEDERALLY SPONSORED RESEARCH OR DEVELOPMENT

The invention was made with Government Support under GM129007, R01 CA196885, and R01 GM129007, awarded by the National Institutes of Health. The government therefore has certain rights in the invention.

TECHNICAL FIELD

This disclosure relates to peptides that bind MENA and methods of using such peptides in the treatment of cancer.

REFERENCE TO SEQUENCE LISTING

The Sequence Listing submitted as a file named "MIT_22897_J_US_ST25.txt" created on Nov. 22, 2024, and has a file size of 37,550 bytes is hereby incorporated by reference pursuant to 37 C.F.R. § 1.823(b)(1).

BACKGROUND

Cytoskeleton-regulating Ena/VASP proteins are recruited to different regions of the cell by binding proline-rich short, linear motifs (SLiMs) via their N-terminal EVH1 domains and promote actin polymerization via their C-terminal EVH2 domains. The three paralogous family members in humans, ENAH Also called MENA or hMena), EVL, and VASP, are implicated in many cellular functions. For example, recruitment of Ena/VASP paralogs by FYB1 to phagocytic cups is essential for phagocytosis in macrophages. Ena/VASP proteins are also important in regulating cell motility, and in axon guidance through the Netrin-1/DCC pathway. Dysregulation of Ena/VASP proteins results in pathologies including cancer metastasis and arteriosclerosis establishing them as attractive therapeutic targets. In particular, ENAH and its isoform ENAHINV are highly expressed in invasive cancer cells, and these proteins have been proposed both as biomarkers and as candidate therapeutic targets for metastatic disease. Previous work has explored the development of ENAH-binding mini-proteins and small-molecule inhibitors.

The Ena/VASP EVH1 domain recognizes the SLiM [FWYL]PXΦP (SEQ ID NO:80), where X is any amino acid, and Φ is any hydrophobic residue. This motif ("FP4 (SEQ ID NO:46)"), readily adopts a polyproline type II (PPII) helix structure and binds weakly to the EVH1 domain. Searching for the low complexity FP4 (SEQ ID NO:46) motif in the human proteome, using the definition above, yields 5067 instances. Not all of these motifs have the opportunity to engage Ena/VASP proteins in the cell, given that spatial, structural, and temporal context are important determinants for cellular interaction. But the number of potential interaction partners is clearly large and raises the question of whether sequence determinants beyond the FP4 (SEQ ID NO:46) motif affect molecular recognition specificity.

Ena/VASP EVH1 domains are part of a larger EVH1 family also found in WASP, SPRED, and Homer proteins, many of which converge to regulate the actin cytoskeleton. Confoundingly, the binding specificity profiles these distinct EVH1 domains overlap, when considering only their low complexity SLiM profiles. The extent to which these domains cross-react vs. bind selectively in the cell is unknown. Even within the Ena/VASP family, there are outstanding questions about EVH1 interaction specificity. ENAH, VASP, and EVL proteins have distinct functions, subcellular localizations, and binding partners. For example, knockdown of ENAH or VASP in migratory breast cancer cells decreases their invasive potential, while EVL is a known suppressor of breast cancer cell invasion. Yet the three proteins are 100% identical in sequence in the core FP4 (SEQ ID NO:46) binding groove and share 62-72% sequence similarity throughout the EVH1 domain. This creates considerable challenges to creating selective peptides useful as therapies.

There is increasing evidence that Mena and isoform of Mena (Mena$^{INV}$) may be useful therapeutic targets and biomarkers (Oudin et al. (2017) *Trends in Cancer* 3:7). Evidence from a murine model suggests that Mena deficiency delays tumor progression (Roussos et al. Breast Cancer Research 2010, 12:R101) Moreover, Mena confers resistance to paclitaxel in certain triple-negative breast cancers (Oudin et al. (2011) *Mol Cancer Ther* 16:143).

SUMMARY

Described herein is a method for treating cancer comprising administering a composition comprising a polypeptide comprising the amino acid sequence LPPPPMEVLMDKSFASLES (SEQ ID NO:1). In various cases, the polypeptide comprises an amino acid sequence selected from the groups consisting of: NLEHLPPPPMEVLMDKSFASLES (SEQ ID NO:2), EMEGNLEHLPPPPMEVLMDKSFASLES (SEQ ID NO:3), and NLEHLPPPPMEVLMDKSFASLESGSGSPPPPPF (SEQ ID NO:4). Also described is a method for treating cancer comprising administering a composition comprising a polypeptide comprising the amino acid sequence LPPPPMEVLMDKSFASLES (SEQ ID NO:1) with no more than three single amino acid substitutions and a method for treating cancer comprising administering a composition comprising a polypeptide comprising the amino acid sequence FDDFPPPPPPPPPVDYEDLPSISGNFPPPPPL (SEQ ID NO:5) or a polypeptide comprising the amino acid sequence FDDFPPPPPPPPPVDYEDLPSISGNFPPPPPL (SEQ ID NO:5) with no more than 2 single amino acid substitutions. In various cases, the polypeptide is 16-60 or 23-60 amino acids long. In various cases the cancer is selected from the group consisting of: breast cancer, cervical cancer, colorectal cancer, and pancreatic cancer.

Also described is: an isolated polypeptide comprising or consisting of the amino acid sequence LPPPPMEVLMDKSFASLES (SEQ ID NO:1), NLEHLPPPPMEVLMDKSFASLES (SEQ ID NO:2), EMEGNLEHLPPPPMEVLMDKSFASLES (SEQ ID NO:3), NLEHLPPPPMEVLMDKSFASLESGSGSPPPPPF (SEQ ID NO:4) or FDDFPPPPPPPPPVDYEDLPSISGNFPPPPPL (SEQ ID NO:5) as well as a pharmaceutical composition comprising any of the isolated polypeptide and a compound comprising any of the isolated polypeptides covalently linked to a moiety that facilitates penetration of a mammalian cell.

In various cases, the method further comprising administering a taxane chemotherapy (e.g., a taxane chemotherapy is selected from the group consisting of paclitaxel, albumin-bound paclitaxel and docetaxel). Also described is a method for reducing resistance to a taxane chemotherapy in a patient suffering from a cancer (e.g., breast cancer), the method comprising administering a polypeptide described herein.

Also described is a method for treating cancer, the method comprising administering to a patient in need thereof, a nucleic acid molecule (e.g., an mRNA) encoding a polypeptide described herein.

In some cases of the compounds described herein, the peptide includes at least 16 amino acids. In some cases the peptide includes up to 60 amino acids (e.g., 24, 25, 26, 27, 28, 29, 30, 31, 32, 33, 34, 35, 36, 37, 38, 39, 40, 41, 42, 43, 44, 45, 46, 47, 48, 49, 50, etc.). In some cases the peptide no more than 60 amino acids (e.g., 24, 25, 26, 27, 28, 29, 30, 31, 32, 33, 34, 35, 36, 37, 38, 39, 40, 41, 42, 43, 44, 45, 46, 47, 48, 49, 50, etc.). In some cases, the compounds include at least one amino acid that is not one of the 20 common, naturally-occurring amino acids.

In some cases, the compounds described herein also comprise a detectable label. In some cases, the detectable label is linked to the peptide.

In some cases, the compounds described herein also comprise a moiety linked to the peptide. In some cases, the moiety can be a functional peptide, polyethylene glycol (PEG), alkyl groups (e.g., C1-C20 straight or branched alkyl groups), fatty acid radicals, and combinations thereof. In some cases, the peptide is linked to PEG.

In some cases of the compounds described herein, the peptide is linked to a second peptide or functional moiety. In some cases the second peptide or functional moiety modulates the activity of the compound. For example, in some cases the second peptide or functional moiety modulates the solubility of the compound, modulates the stability of the compound, modulates the ability of the compound to permeabilize a cell, acts to target the compound within/to the cell, labels the compound, modulates the affinity of the compound for MENA. Modulating the activity of the compounds described herein can be increasing or decreasing the activity.

In some cases of the compounds described herein, the peptides are modified. In some cases, the modification is selected from the group consisting of acetylation, amidation, biotinylation, cinnamoylation, farnesylation, fluoresceination, formylation, myristoylation, palmitoylation, phosphorylation, stearoylation, succinylation, sulfurylation, and combinations thereof.

In some cases of the compounds described herein, the peptides include at least one peptide bond that is replaced by a non-natural peptide bond. In some cases, the peptide bond is replaced by a bond selected from the group consisting of a retro-inverso bonds (C(O)—NH); a reduced amide bond (NH—CH2); a thiomethylene bond (S—CH2 or CH2-S); an oxomethylene bond (O—CH2 or CH2-O); an ethylene bond (CH2-CH2); a thioamide bond (C(S)—NH); a trans-olefin bond (CH=CH); a fluoro substituted trans-olefin bond (CF=CH); a ketomethylene bond (C(O)—CHR) or CHR—C(O) wherein R is H or CH3; and a fluoro-ketomethylene bond (C(O)—CFR or CFR—C(O) wherein R is H or F or CH3.

In some cases, the compounds described herein also comprise a carrier.

In some aspects, the present disclosure provides a pharmaceutical composition comprising the compounds described herein. In some aspects, the present disclosure provides a method of treating cancer comprising administering the compound described herein.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF THE DRAWINGS

FIG. 9: Bidendate binding characterization Models of bidentate binding where the two FP4 (SEQ ID NO:46) motifs are linked in one of two orientations. FP4 (SEQ ID NO:46) motifs are labelled and the minimum length modelled linkers are the regions connecting the two FP4 (SEQ ID NO:46) motifs.

FIG. 10A-10B: PCARE truncations and dTERMen mutations. (A) BLI binding curves for PCARE 36-mer (SEQ ID NO:18) and truncations of the PCARE 36-mer (SEQ ID NO:2, SEQ ID NO:77, and SEQ ID NO:78). N.f.=could not be fit to give an accurate $K_D$, given this concentration range. (B) Lowest dTERMen energy obtained when swapping 0-6 residues from ENAH into EVL, when modeling on the structure of ENAH EVH1 bound to PCARE. * means the mutation was added through manual inspection.

DETAILED DESCRIPTION

Figure 1:
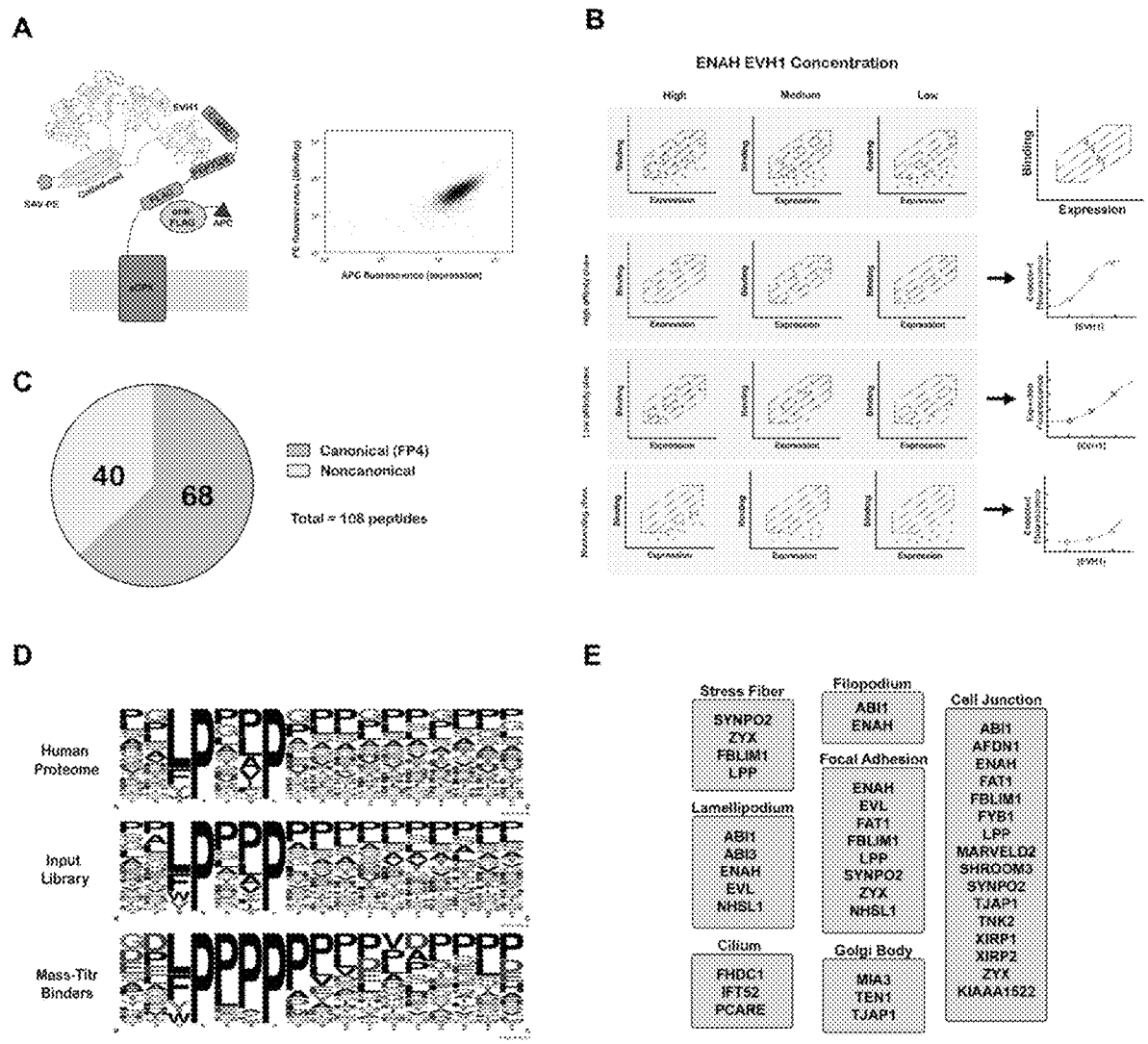
FIG. 1A-1E: Mass-Titr screening identifies biologically relevant ENAH EVH1 ligands. (A) At left, bacterial surface display schematic. Library peptides flanked by a FLAG tag and a c-myc tag were expressed as fusions to the C-terminus of eCPX on the surface of E. coli. Cells were labelled with anti-FLAG-APC to quantify expression and then incubated with tetrameric ENAH EVH1 domain, which was detected by streptavidin conjugated to phycoerythrin (SAV-PE). At right, a FACS plot for surface-displayed ActA peptide binding to 10 μM ENAH EVH1 tetramer. (B) MassTitr schematic. The effective fluorescence signal of a library clone is estimated using the distribution of cells across gates, which is determined by sequencing sorted pools. Sorting is repeated at multiple concentrations of ENAH to assess concentration dependent binding. (C) Distribution of Mass-Titr hits after filtering; 68 peptides contained a canonical FP4 (SEQ ID NO:46) motif matching the regular expression [FWYL]P.[FWYLIAVP]P (SEQ ID NO:81). (D) Logos made from the sequences that match the FP4 (SEQ ID NO:46) motif in the human proteome, the input library, and the Mass-Titr binders. (E) Annotated subcellular localizations of Mass-titr hits predicted to be disordered and localized in the cytoplasm.
Figure 2:
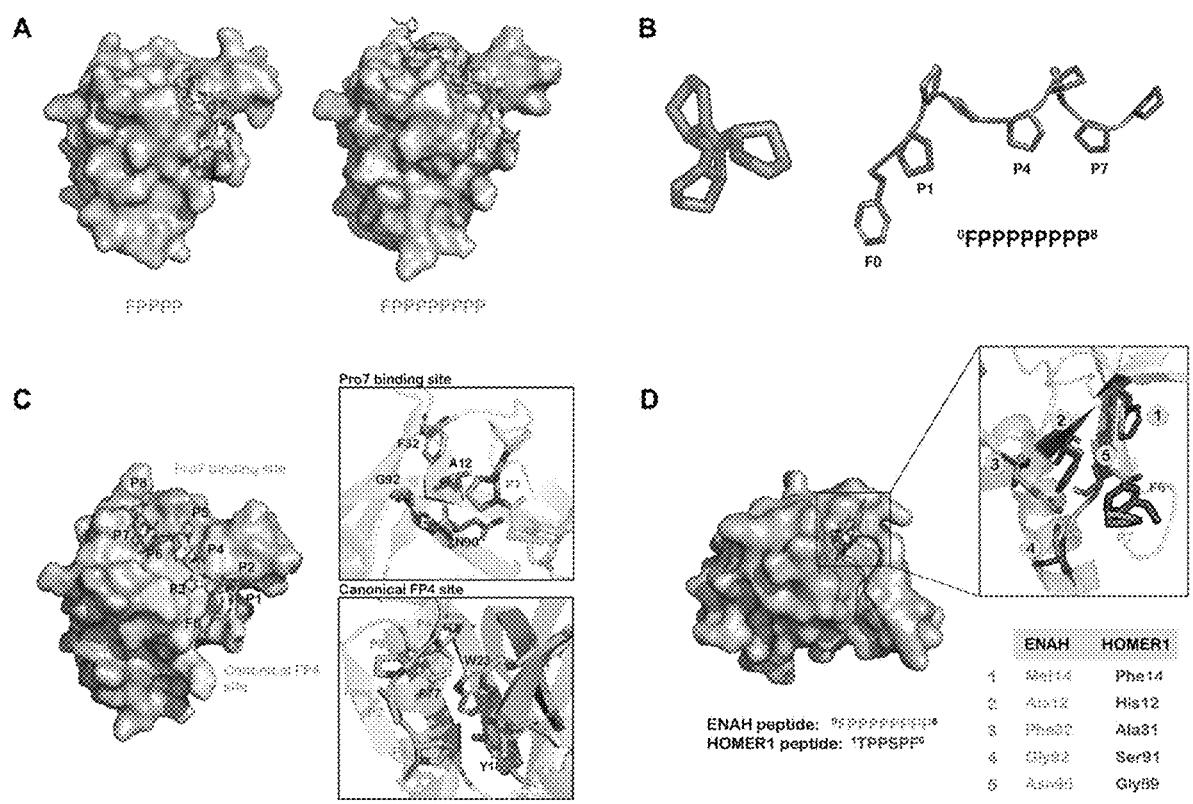
FIG. 2A-2D: Prolines C-terminal to FP4 (SEQ ID NO:46) can engage a novel ENAH binding site. (A) Surface representation of the ENAH EVH1 domain bound to $FP_4$ (SEQ ID NO:46) (PDB 1EVH) or to $FP_8$ (SEQ ID NO:6). The core FP4 (SEQ ID NO:46) motif is light blue, the $P_4$ flank is orange. (B) Axial view of a polyproline type II helix highlighting three-fold symmetry (left); a side view shows P1, P4, and P7 facing the same side (right). (C) Surface representation of ENAH EVH1 domain bound to $FP_8$ (SEQ ID NO:6). with the canonical binding site in light blue and the extended site (Pro7 site) in orange; insets show details of the interactions. (D) Comparison of the extended site with the corresponding region of the Homer EVH1 domain (SEQ ID NO:71). HOMER1 residues are red, ENAH residues are orange.

Described below are studies that identified a 36-residue human proteome-derived peptide binders of the ENAH EVH1 domain. The studies identified three distinct ways in which local and distal sequence elements surrounding the FP4 (SEQ ID NO:46) motif modulate ENAH binding affinity and specificity. Also identified a network of dispersed residues in the ENAH EVH1 domain that allows it to adopt a conformation inaccessible to EVL and VASP, allowing ENAH to selectively bind to retinal protein PCARE. In the studies described below, this interaction were validated in cells. The studies below also describe a nanomolar EVH1 binder that is 400-600-fold selective for ENAH over VASP and EVL.

Amino acids are the building blocks of the peptides herein. The term "amino acid" refers to a molecule containing both an amino group and a carboxyl group as well as a side chain. Amino acids suitable for inclusion in the peptides disclosed herein include, without limitation, natural alpha-amino acids such as D- and L-isomers of the 20 common naturally-occurring alpha-amino acids found in peptides (e.g., Ala (A), Arg (R), Asn (N), Cys (C), Asp (D), Gln (Q), Glu (E), Gly (G), His (H), Ile (I), leu (L), Lys (K), Met (M), Phe (F), Pro (P), Ser (S), Thr (T), Trp (W), Tyr (Y), and Val (V), uncommon alpha-amino acids (including, but not limited to $\alpha,\alpha$-disubstituted and N-alkylated amino acids), common naturally-occurring beta-amino acids (e.g., beta-alanine), and uncommon beta-amino acids. Amino acids used in the construction of peptides of the present invention can be prepared by organic synthesis, or obtained by other routes, such as, for example, degradation of or isolation from a natural source.

There are many known amino acids beyond the 20 common naturally-occurring amino acids, any of which may be included in the peptides of the present invention. Some examples of uncommon amino acids are 4-hydroxyproline, α-4-pentenyl alanine, aminoisobutyric acid (Aib), cyclo-hexyl alanine (Cha), norleucine, desmosine, gamma-aminobutyric acid, beta-cyanoalanine, norvaline, 4-(E)-butenyl-4(R)-methyl-N-methyl-L-threonine, N-methyl-L-leucine, 1-amino-cyclopropanecarboxylic acid, 1-amino-2-phenyl-cyclopropanecarboxylic acid, 1-amino-cyclobutanecarboxylic acid, 4-amino-cyclopentenecarboxylic acid, 3-amino-cyclohexanecarboxylic acid, 4-piperidylacetic acid, 4-amino-1-methylpyrrole-2-carboxylic acid, 2,4-di-aminobutyric acid, 2,3-diaminopropionic acid, 2,4-di-aminobutyric acid, 2-aminoheptanedioic acid, 4-(aminomethyl)benzoic acid, 4-aminobenzoic acid, ortho-, meta- and/or para-substituted phenylalanines (e.g., substituted with —C(=O)C$_6$H$_5$; —CF$_3$; —CN; -halo; —NO2; CH$_3$), disubstituted phenylalanines, substituted tyrosines (e.g., further substituted with -Q=O)C$_6$H$_5$; —CF$_3$; —CN; -halo; —NO$_2$; CH$_3$), and statine. Additionally, amino acids can be derivatized to include amino acid residues that are hydroxylated, phosphorylated, sulfonated, acylated, and glycosylated, to name a few.

In some instances, peptides include only common, naturally-occurring amino acids, although uncommon amino acids (i.e., compounds that do not commonly occur in nature but that can be incorporated into a polypeptide chain) and/or amino acid analogs as are known in the art may alternatively be employed. Also, one or more of the amino acids in a peptide or polypeptide may be modified, for example, by the addition of a chemical entity such as a carbohydrate group, a hydroxyl group, a phosphate group, a farnesyl group, an isofarnesyl group, a fatty acid group, a linker for conjugation, functionalization, or other modification, etc.

In some instances, peptides can include 1, 2, 3, 4, or 5 single amino acid substitutions, e.g., conservative substitutions. In some instances, a "conservative amino acid substitution" can include substitutions in which one amino acid residue is replaced with another naturally-occurring amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine).

The addition of polyethelene glycol (PEG) molecules can improve the pharmacokinetic and pharmacodynamic properties of the polypeptide. For example, PEGylation can reduce renal clearance and can result in a more stable plasma concentration. PEG is a water soluble polymer and can be represented as linked to the polypeptide as formula: XO—(CH$_2$CH$_2$O)$_n$—CH$_2$CH$_2$—Y where n is 2 to 10,000 and X is H or a terminal modification, e.g., a C$_{1-4}$ alkyl; and Y is an amide, carbamate or urea linkage to an amine group (including but not limited to, the epsilon amine of lysine or the N-terminus) of the polypeptide. Y may also be a maleimide linkage to a thiol group (including but not limited to, the thiol group of cysteine). Other methods for linking PEG to a polypeptide, directly or indirectly, are known to those of ordinary skill in the art. The PEG can be linear or branched. Various forms of PEG including various functionalized derivatives are commercially available.

PEG having degradable linkages in the backbone can be used. For example, PEG can be prepared with ester linkages that are subject to hydrolysis. Conjugates having degradable PEG linkages are described in WO 99/34833; WO 99/14259, and U.S. Pat. No. 6,348,558.

In certain embodiments, macromolecular polymer (e.g., PEG) is attached to an agent described herein through an intermediate linker. In certain embodiments, the linker is made up of from 1 to 20 amino acids linked by peptide bonds, wherein the amino acids are selected from the 20 common, naturally-occurring amino acids. Some of these amino acids may be glycosylated, as is well understood by those in the art. In other embodiments, the 1 to 20 amino acids are selected from glycine, alanine, proline, asparagine, glutamine, and lysine. In other embodiments, a linker is made up of a majority of amino acids that are sterically unhindered, such as glycine and alanine. Non-peptide linkers are also possible. For example, alkyl linkers such as —NH(CH$_2$)$_n$C(O)—, wherein n=2-20 can be used. These alkyl linkers may further be substituted by any non-sterically hindering group such as lower alkyl (e.g., C$_1$-C$_6$) lower acyl, halogen (e.g., Cl, Br), CN, NH$_2$, phenyl, etc. U.S. Pat. No. 5,446,090 describes a bifunctional PEG linker and its use in forming conjugates having a peptide at each of the PEG linker termini.

The peptides can also be modified, e.g., to further facilitate cellular uptake or increase in vivo stability, in some embodiments. For example, acylating or PEGylating a peptidomimetic macrocycle facilitates cellular uptake, increases bioavailability, increases blood circulation, alters pharmacokinetics, decreases immunogenicity and/or decreases the needed frequency of administration.

One manner of making of the peptides described herein is using solid phase peptide synthesis (SPPS). The C-terminal amino acid is attached to a cross-linked polystyrene resin via an acid labile bond with a linker molecule. This resin is insoluble in the solvents used for synthesis, making it relatively simple and fast to wash away excess reagents and by-products. The N-terminus is protected with the Fmoc group, which is stable in acid, but removable by base. Any side chain functional groups are protected with base stable, acid labile groups.

Peptide bonds can be replaced, e.g., to increase physiological stability of the peptide, by: a retro-inverso bonds (C(O)—NH); a reduced amide bond (NH—CH$_2$); a thiomethylene bond (S—CH$_2$ or CH$_2$—S); an oxomethylene bond (O—CH$_2$ or CH$_2$—O); an ethylene bond (CH$_2$—CH$_2$); a thioamide bond (C(S)—NH); a trans-olefin bond (CH=CH); a fluoro substituted trans-olefin bond (CF=CH); a ketomethylene bond (C(O)—CHR) or CHR—C(O) wherein R is H or CH$_3$; and a fluoro-ketomethylene bond (C(O)—CFR or CFR—C(O) wherein R is H or F or CH$_3$.

The polypeptides can be further modified by: acetylation, amidation, biotinylation, cinnamoylation, farnesylation, fluoresceination, formylation, myristoylation, palmitoylation, phosphorylation (Ser, Tyr or Thr), stearoylation, succinylation and sulfurylation. As indicated above, peptides can be conjugated to, for example, polyethylene glycol (PEG); alkyl groups (e.g., C1-C20 straight or branched alkyl groups); fatty acid radicals; and combinations thereof.

In some instances, peptides can include a detectable label (a moiety that has at least one element, isotope, or functional group incorporated into the moiety which enables detection of the peptide to which the label is attached). Labels can be directly attached (i.e., via a bond) or can be attached by a linker (e.g., such as, for example, a cyclic or acyclic, branched or unbranched, substituted or unsubstituted alkylene; cyclic or acyclic, branched or unbranched, substituted or unsubstituted alkenylene; cyclic or acyclic, branched or unbranched, substituted or unsubstituted alkynylene; cyclic or acyclic, branched or unbranched, substituted or unsubstituted heteroalkylene; cyclic or acyclic, branched or unbranched, substituted or unsubstituted heteroalkenylene; cyclic or acyclic, branched or unbranched, substituted or unsubstituted heteroalkynylene; substituted or unsubstituted arylene; substituted or unsubstituted heteroarylene; or substituted or unsubstituted acylene, or any combination thereof, which can make up a linker). Labels can be attached to a peptide at any position that does not interfere with the biological activity or characteristic of the inventive polypeptide that is being detected.

Labels can include: labels that contain isotopic moieties, which may be radioactive or heavy isotopes, including, but not limited to, $^2$H, $^3$H, $^{13}$C, $^{14}$C, $^{15}$N, $^{31}$P, $^{32}$P, $^{35}$S, $^{67}$Ga, $^{99m}$Tc (Tc-99m), $^{111}$In, $^{123}$I, $^{125}$I, $^{169}$Yb, and $^{186}$Re; labels that include immune or immunoreactive moieties, which may be antibodies or antigens, which may be bound to enzymes {e.g., such as horseradish peroxidase); labels that are colored, luminescent, phosphorescent, or include fluorescent moieties (e.g., such as the fluorescent label FITC); labels that have one or more photoaffinity moieties; labels that have ligand moieties with one or more known binding partners (such as biotin-streptavidin, FK506-FKBP, etc.).

In some instances, labels can include one or more photoaffinity moieties for the direct elucidation of intermolecular interactions in biological systems. A variety of known photophores can be employed, most relying on photoconversion of diazo compounds, azides, or diazirines to nitrenes or carbenes (see, e.g., Bayley, H., Photogenerated Reagents in Biochemistry and Molecular Biology (1983), Elsevier, Amsterdam, the entire contents of which are incorporated herein by reference). In certain embodiments of the invention, the photoaffinity labels employed are o-, m- and p-azidobenzoyls, substituted with one or more halogen moieties, including, but not limited to 4-azido-2,3,5,6-tetrafluorobenzoic acid.

Labels can also be or can serve as imaging agents. Exemplary imaging agents include, but are not limited to, those used in positron emissions tomography (PET), computer assisted tomography (CAT), single photon emission computerized tomography, x-ray, fluoroscopy, and magnetic resonance imaging (MRI); anti-emetics; and contrast agents. Exemplary diagnostic agents include but are not limited to, fluorescent moieties, luminescent moieties, magnetic moieties; gadolinium chelates (e.g., gadolinium chelates with DTPA, DTPA-BMA, DOTA and HP-DO3A), iron chelates, magnesium chelates, manganese chelates, copper chelates, chromium chelates, iodine-based materials useful for CAT and x-ray imaging, and radionuclides. Suitable radionuclides include, but are not limited to, $^{123}$I, $^{125}$I, $^{130}$I, $^{131}$I, $^{133}$I, $^{135}$I, $^{47}$Sc, $^{72}$As, $^{72}$Se, $^{90}$Y, $^{88}$Y, $^{97}$Ru, $^{100}$Pd, $^{101}$mRh, $^{119}$Sb, $^{128}$Ba, $^{197}$Hg, $^{211}$At, $^{212}$Bi, $^{212}$Pb, $^{109}$Pd, $^{111}$In, $^{67}$Ga, $^{68}$Ga, $^{67}$Cu, $^{75}$Br, $^{77}$Br, $^{99}$mTc, $^{14}$C, $^{13}$N, $^{15}$0, $^{32}$P, $^{33}$P, and $^{18}$F.

Fluorescent and luminescent moieties include, but are not limited to, a variety of different organic or inorganic small molecules commonly referred to as "dyes," "labels," or "indicators." Examples include, but are not limited to, fluorescein, rhodamine, acridine dyes, Alexa dyes, cyanine dyes, etc. Fluorescent and luminescent moieties may include a variety of naturally-occurring proteins and derivatives thereof, e.g., genetically engineered variants. For example, fluorescent proteins include green fluorescent protein (GFP), enhanced GFP, red, blue, yellow, cyan, and sapphire fluorescent proteins, reef coral fluorescent protein, etc. Luminescent proteins include luciferase, aequorin and derivatives thereof. Numerous fluorescent and luminescent dyes and proteins are known in the art (see, e.g., U.S. Patent Publication 2004/0067503; Valeur, B., "Molecular Fluorescence: Principles and Applications," John Wiley and Sons, 2002; and Handbook of Fluorescent Probes and Research Products, Molecular Probes, 9th edition, 2002).

Pharmaceutical Compositions

One or more of the peptides disclosed herein (e.g., one or more of SEQ ID NOs: 1-12) can be formulated for use as or in pharmaceutical compositions. Such compositions can be formulated or adapted for administration to a subject via any route, e.g., any route approved by the Food and Drug Administration (FDA). Exemplary methods are described in the FDA's CDER Data Standards Manual, version number 004 (which is available at fda.give/cder/dsm/DRG/drg00301.htm). For example, compositions can be formulated or adapted for administration by inhalation (e.g., oral and/or nasal inhalation (e.g., via nebulizer or spray)), injection (e.g., intravenously, intra-arterial, subdermally, intraperitoneally, intramuscularly, and/or subcutaneously); and/or for oral administration, transmucosal administration, and/or topical administration (including topical (e.g., nasal) sprays and/or solutions).

In some instances, pharmaceutical compositions can include an effective amount of one or more peptides. The terms "effective amount" and "effective to treat," as used herein, refer to an amount or a concentration of one or more compounds or a pharmaceutical composition described herein utilized for a period of time (including acute or chronic administration and periodic or continuous administration) that is effective within the context of its administration for causing an intended effect or physiological outcome (e.g., treatment of cancer).

Pharmaceutical compositions of this invention can include one or more peptides and any pharmaceutically acceptable carrier and/or vehicle. In some instances, pharmaceuticals can further include one or more additional therapeutic agents in amounts effective for achieving a modulation of disease or disease symptoms.

The term "pharmaceutically acceptable carrier or adjuvant" refers to a carrier or adjuvant that may be administered to a patient, together with a compound of this invention, and which does not destroy the pharmacological activity thereof and is nontoxic when administered in doses sufficient to deliver a therapeutic amount of the compound.

The pharmaceutical compositions may contain any conventional non-toxic pharmaceutically-acceptable carriers, adjuvants or vehicles. In some cases, the pH of the formulation may be adjusted with pharmaceutically acceptable acids, bases or buffers to enhance the stability of the formulated compound or its delivery form. The term parenteral as used herein includes subcutaneous, intra-cutaneous, intra-venous, intra-muscular, intra-articular, intra-arterial, intra-synovial, intra-sternal, intra-thecal, intra-lesional and intra-cranial injection or infusion techniques.

A sterile injectable preparation may also be a sterile injectable solution or suspension in a non-toxic parenterally acceptable diluent or solvent, for example, as a solution in 1,3-butanediol. Among the acceptable vehicles and solvents that may be employed are mannitol, water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant, or carboxymethyl cellulose or similar dispersing agents which are commonly used in the formulation of pharmaceutically acceptable dosage forms such as emulsions and or suspensions.

In some instances, one or more peptides disclosed herein can be conjugated, for example, to a carrier protein. Such conjugated compositions can be monovalent or multivalent. For example, conjugated compositions can include one peptide disclosed herein conjugated to a carrier protein. Alternatively, conjugated compositions can include two or more peptides disclosed herein conjugated to a carrier.

As used herein, when two entities are "conjugated" to one another they are linked by a direct or indirect covalent or non-covalent interaction. In certain embodiments, the association is covalent. In other embodiments, the association is non-covalent. Non-covalent interactions include hydrogen bonding, van der Waals interactions, hydrophobic interactions, magnetic interactions, electrostatic interactions, etc. An indirect covalent interaction is when two entities are covalently connected, optionally through a linker group.

Carrier proteins can include any protein that increases or enhances immunogenicity in a subject. Exemplary carrier proteins are described in the art (see, e.g., Fattom et al., Infect. Immun., 58:2309-2312, 1990; Devi et al., Proc. Natl. Acad. Sci. USA 88:7175-7179, 1991; Li et al., Infect. Immun. 57:3823-3827, 1989; Szu et al., Infect. Immun. 59:4555-4561, 1991; Szu et al., J. Exp. Med. 166:1510-1524, 1987; and Szu et al., Infect. Immun. 62:4440-4444, 1994). Polymeric carriers can be a natural or a synthetic material containing one or more primary and/or secondary amino groups, azido groups, or carboxyl groups. Carriers can be water soluble.

Methods of Treatment

The disclosure includes methods of using the peptides herein for the prophylaxis and/or treatment of cancer. The terms "treat" or "treating," as used herein, refers to partially or completely alleviating, inhibiting, ameliorating, and/or relieving the disease or condition from which the subject is suffering.

In general, methods include selecting a subject and administering to the subject an effective amount (a therapeutically effective amount) of one or more of the peptides herein, e.g., in or as a pharmaceutical composition, and optionally repeating administration as required for the prophylaxis or treatment of a cancer.

Specific dosage and treatment regimens for any particular patient will depend upon a variety of factors, including the activity of the specific compound employed, the age, body weight, general health status, sex, diet, time of administration, rate of excretion, drug combination, the severity and course of the disease, condition or symptoms, the patient's disposition to the disease, condition or symptoms, and the judgment of the treating physician.

EXAMPLES

Described below are studies that identified a 36-residue human proteome-derived peptide binders of the ENAH EVH1 domain. The studies identified three distinct ways in which local and distal sequence elements surrounding the FP4 (SEQ ID NO:46) motif modulate ENAH binding affinity and specificity. Also identified a network of dispersed residues in the ENAH EVH1 domain that allows it to adopt a conformation inaccessible to EVL and VASP, allowing ENAH to selectively bind to retinal protein PCARE. In the studies described below, this interaction were validated in cells. The studies below also describe a nanomolar EVH1 binder that is 400-600-fold selective for ENAH over VASP and EVL.

Example 1: MassTitr Identifies ENAH EVH1
Domain Binding Peptides from the Human
Proteome with a Wide Range of Affinities MassTitr is a recently developed SORT-SEQ method, similar to Tite-seq, that is based on fluorescence-activated cell sorting (FACS) of a library of peptide-displaying bacterial and subsequent deconvolution of signals by deep sequencing. Specifically, as shown in FIGS. 1A and B, engineered *Escherichia coli* cells are sorted into bins according to their peptide binding signal across a range of receptor concentrations, and the binding signal for each peptide at each receptor concentration is extracted by analysis of the sequences identified in each bin. The ability of this method to detect concentration-dependent binding in high throughput confers two advantages relative to traditional enrichment sorts: it reduces the rate of false positives, and it allows for the identification of binders with a broader range of affinities.

We used MassTitr to identify ENAH EVH1 binders from the human proteome by screening a library of 416,611 36-mer peptides with 7-residue overlaps (the T7-pep library). The T7-pep library spans the entire protein-coding space of the human genome (FIG. 1B), and we hypothesized that the long length of peptides in this library would illuminate the impact of sequence context surrounding the FP4

(SEQ ID NO:46) motif in a biologically relevant sequence space. We first prescreened the library for binding to a tetramerized ENAH EVH1 domain, to enrich binders. We then ran MassTitr on the prescreened library, using 8 concentrations of ENAH EVH1 tetramer. After sorting, sequencing, and filtering based on read counts, 108 unique high-confidence binders were identified (FIG. 1C and not shown) and classified as either high-affinity or low-affinity as described in the methods.

We validated 16 peptide hits for binding to monomeric ENAH EVH1 domain, using biolayer interferometry (BLI) to determine dissociation constants that ranged from 0.1 µM to 63 µM (Table 2). With the exception of SHROOM3 peptide, binders classified as high-affinity by MassTitr bound to ENAH EVH1 domain more tightly than peptides classified as low-affinity. Many newly identified peptides bound with affinities similar to or tighter than a well-studied control peptide from *Listeria monocytogenes* protein ActA, which bound with $K_D$=5.2 µM in our BLI assay (Table 2). Prior to this work, a single FP4 (SEQ ID NO:46)-motif containing sequence from ActA was the tightest known endogenously derived binder of Ena/VASP EVH1 domains.

Although the majority of MassTitr hits contained FP4 (SEQ ID NO:46) motifs (FIGS. 1C, D), 40 out of the 108 high-confidence hits did not (FIG. 1C). The construct that we used for screening included both the ENAH EVH1 domain and the native coiled-coil tetramerization domain. Thus, it was unsurprising that peptides corresponding to the coiled-coil regions of EVL and ENAH, which are known to form coiled-coil homo- and hetero-tetramers, were found as hits. A peptide containing a previously characterized non-canonical motif from FAT3, which is known to interact with the Ena/VASP family, was also identified. In addition, MassTitr uncovered sequences from two proteins, TJAP1 and KIAA1522, which we validated to bind with mid-micromolar affinity to monomeric ENAH EVH1 domain (Table 2). These sequences, albeit proline-rich, bear little resemblance to the canonical FP4 (SEQ ID NO:46) motif, indicating that ENAH EVH1 domain can bind a broader range of sequences than has been reported, supporting increasing evidence that the ENAH EVH1 domain can bind sequences beyond the FP4 (SEQ ID NO:46) motif.

Figure 7:
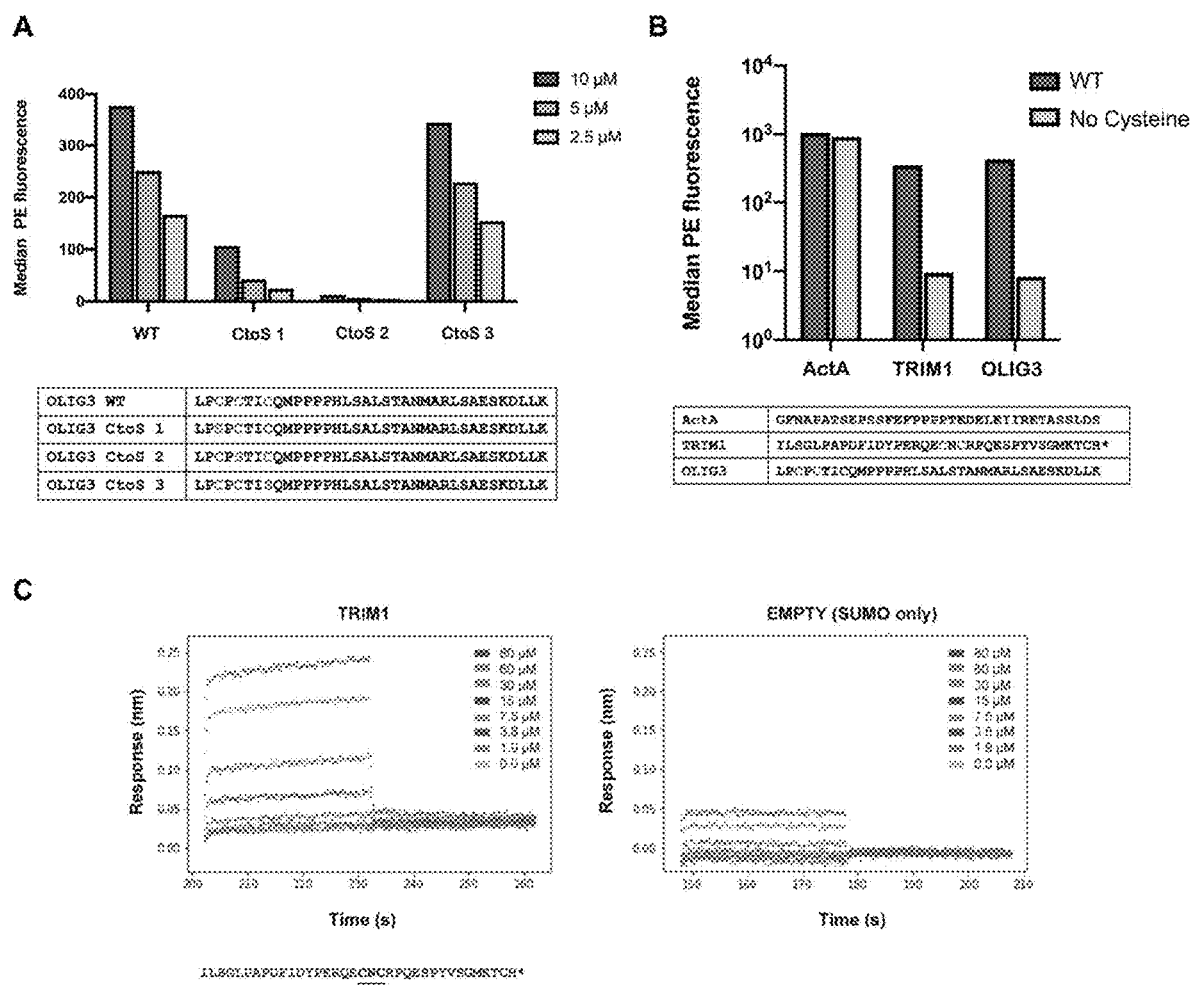
FIG. 7A-7C: Peptides containing CXC motifs bind to ENAH (A) The median fluorescence (PE) binding signal of each OLIG3 WT (SEQ ID NO:73) and OLIG3 cysteine mutant as represented by SEQ ID NO:74, SEQ ID NO:75 and SEQ ID NO:76 displayed on the surface of bacteria in the presence of either 10, 5, or 2.5 μM ENAH tetramer and 2 mM DTT. (B) The median PE binding signal of ActA peptide (SEQ ID NO:22), or CXC-motif containing peptides TRIM1 (SEQ ID NO:67) or OLIG3 (SEQ ID NO:73), displayed on the surface of bacteria in the presence of either 5 μM ENAH tetramer, or 5 μM cysteine-less ENAH tetramer and 2 mM DTT. (C) BLI plot for ENAH EVH1 monomer binding to a CXC-motif peptide from TRIM1 (SEQ ID NO:67) fused to SUMO (left) or to SUMO protein only (EMPTY, right). The TRIM1 binding curve did not saturate.
Figure 8:
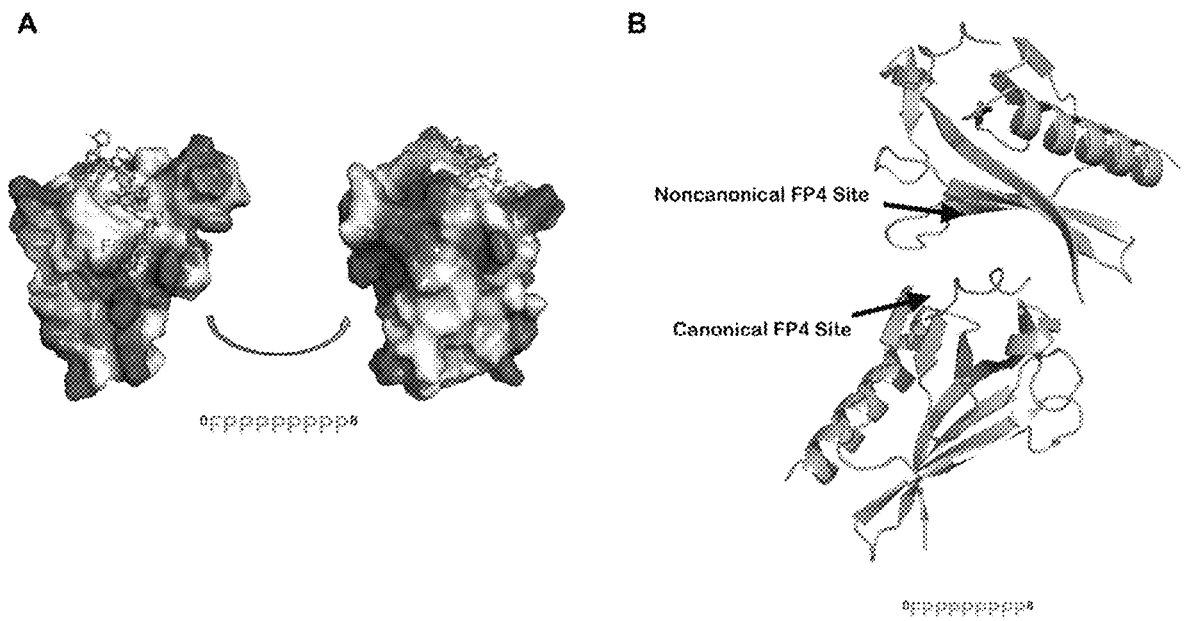
FIG. 8A-8B: Additional analyses of the ENAH EVH1-ABI1 structure (A) Surface representation of the ENAH EVH1 domain, colored by electrostatic potential, bound to an FP8 (SEQ ID NO:6) peptide. The figure illustrates that the N- and C-terminal ends of the FP8 (SEQ ID NO:6) peptide are positioned near regions of positive charge on the EVH1 domain. (B) In the ENAH EVH1-ABI1 crystal lattice, part of the FP8 (SEQ ID NO:6) peptide bound to the canonical site of one EVH1 domain contacts the noncanonical site of an adjacent EVH1 domain.

The remaining 35 noncanonical sequences contained CXC motifs. These sequences bound robustly to the ENAH tetramer in bacterial display, and mutating either of the cysteines in a CXC-containing peptide from OLIG3 abrogated binding to ENAH (FIG. 7A). Mutating cysteines in the ENAH EVH1 domain to alanine reduced binding to several CXC containing peptides, but not to an FP4 (SEQ ID NO:46)-motif peptide from ActA (FIG. 7B), suggesting that binding of CXC peptides to ENAH is enhanced by EVH1 disulfides, despite the presence of 2 mM dithiothreitol (DTT) in the experiments. A peptide from TEN1 that contains both an FP4 (SEQ ID NO:46) motif and a CXC motif was annotated as a high-affinity binder through MassTitr but bound weakly ($K_D$>60 µM) to monomeric EVH1 in a BLI assay (Tables 2). A peptide from E3 ubiquitin ligase TRIM1 that contains a CXC motif but no FP4 (SEQ ID NO:46) motif bound weakly and reversibly to ENAH EVH1 domain by BLI, indicating that some CXC-containing ligands can associate non-covalently (FIG. 7C). Determining which, if any, of the 35 CXC-motif peptides identified here are specific ENAH ligands will require further study.

Example 2: MassTitr Peptides Expand the ENAH Signaling Network

MassTitr detects ENAH EVH1 domain interactions with short peptides displayed on the cell surface. To highlight putative biologically relevant interaction partners of ENAH, we applied a bioinformatic analysis to identify those motifs that are likely to be accessible and co-localized with ENAH. We filtered our high-confidence hits by disorder propensity (IUPRED>0.4) and cytoplasmic subcellular localization. This resulted in 33 peptides, of which 15 are derived from interaction partners known to interact or co-localize with Ena/VASP proteins. Filtered hits were highly enriched in GO biological process terms including actin filament organization (FDR<10-6), and positive regulation of cytoskeleton (FDR<0.05), which align with documented cellular functions of ENAH. Notably, we also identified proteins localized to the Golgi body and cilia, where Ena/VASP function is less defined (FIG. 1E). Taken together, our data identify new putative ENAH interaction partners and their candidate binding motifs and provide a valuable resource to expand Ena/VASP biology for future studies.

Example 3: a Proline-Rich C-Terminal Flank Binds to a Novel Site on the EVH1 Domain to Enhance Affinity in ENAH Interaction Partners Next, we turned to identifying FP4 (SEQ ID NO:46) SLiM-flanking elements that enhance binding to the ENAH EVH1 domain. A sequence logo made of the high-confidence MassTitr hits shows enrichment of prolines C-terminal to the FP4 (SEQ ID NO:46) motif, and a binomial test confirms that peptides containing FP4 (SEQ ID NO:46) motifs followed by three consecutive prolines are enriched our hit list ($p<10^{-11}$; FIG. 1D). A sequence from ENAH interactor ABI1 was among the highest affinity ligands that we validated by BLI, with $K_D$=4 µM (Table 2). ABI1 contains an FP4 (SEQ ID NO:46) motif followed by 4 sequential prolines (referred to here as FP8 (SEQ ID NO:6). Mutating FPPPPPPPP (SEQ ID NO:6) to FPPPPSSSS (SEQ ID NO:7) in the context of the ABI1 36-mer reduced affinity by approximately 4-fold (Table 3). Although this confirms that C-terminal prolines can enhance affinity, the 9-residue peptide FPPPPPPPP (SEQ ID NO:6) alone binds to the ENAH EVH1 domain with $K_D$=29 µM, indicating that additional interactions contribute to the high affinity of ABI. We hypothesized that acidic residues N- and C-terminal to the $FP_8$ (SEQ ID NO:6). sequence could potentially enhance affinity by binding positively charged patches in ENAH. Indeed, truncating the C-terminal and N-terminal acidic flanks on the 36-mer ABI1 decreased affinity by 2.5 and 3-fold, respectively (Table 3).

To understand the structural basis of high-affinity ABI1 binding by ENAH EVH1 domain, we solved a crystal structure of the complex at 1.88 Å resolution. Only the FP8 (SEQ ID NO:6). region was fully resolved in the structure under the crystallization conditions, which included high salt and low pH (FIG. 1A). The peptide twists into a PPII helix, which has threefold rotational symmetry, with every i and i+3 proline facing the same direction (FIG. 1B). Because of this property, the FP8 (SEQ ID NO:6). peptide binds to the ENAH EVH1 domain with prolines 1, 4, and 7 ($^0$FPPPPPPPP$^8$) (SEQ ID NO:6) contacting the EVH1 interface (FIG. 1B). The FP4 (SEQ ID NO:46) portion of the peptide binds the canonical FP4 (SEQ ID NO:46) groove, whereas the 7$^{th}$ proline docks into a previously uncharacterized hot spot on ENAH composed of Ala12, Phe32, and the aliphatic part of the side chain of Asn90 (FIG. 1C). Notably, a similar binding site at the analogous location is used by the Homer EVH1 domain to bind the phenylalanine of $^1$PPXXF$^5$ motifs. This site is relatively shallow in ENAH and modelling large aromatic acids at this position using Pymol leads to severe steric clashes. Homer contains a smaller Gly89 at the site of Asn90 in ENAH and can consequently accommodate the bulky Phe5 ($^1$PPXXF$^5$) (FIG. 1D). Collectively, our results uncover a novel mechanism behind how low complexity FP4 (SEQ ID NO:46) SLiMs co-opt flanking sequence elements to fine tune Ena/VASP-dependent signaling pathways and reveal how individual EVH1 family members evolve mutations to recognize distinct proline-rich sequences that extend beyond the core SLiM.

Example 4: Distal Sequence Elements Enhance ENAH EVH1 Binding Through Multivalent Interactions Another enriched feature of MassTitr-identified binders, relative to the pre-screened input library, is the presence of multiple FP4 (SEQ ID NO:46) motifs (binomial test, p< $10^{-22}$). Multiple motifs are also enriched in MassTitr high-affinity hits relative to all hits (p<0.02), supporting the idea that multiple FP4 (SEQ ID NO:46) motifs enhance affinity. Peptide binders with multiple motifs have preferred spacings of approximately 5 or 15 residues between FP4 (SEQ ID NO:46) motifs (FIG. 3A).

It was previously shown that zyxin, which contains four clustered FP4 (SEQ ID NO:46) motifs, binds to the VASP EVH1 domain by contacting both the canonical FP4 site and a secondary, noncanonical binding site on the opposite side of the EVH1 domain. To examine whether multi-FP4 (SEQ ID NO:46) peptides may achieve higher affinity by engaging an analogous secondary binding site on ENAH, we designed experiments to disrupt this putative site. A crystal structure of ENAH bound to an ActA peptide (PDB 5NC7) contains a second ActA chain bound to the region corresponding to the noncanonical binding site. This was presumed to be a packing artifact, but we speculated that a similar interaction might stabilize the binding of dual-motif ligands. In the ActA peptide-bound structure, the ENAH Arg47 side chain forms a hydrogen bond with a carbonyl on the PPII helix backbone of ActA. In support of a role for this residue in noncanonical site binding, the analogous VASP Arg48 exhibits significant NMR HSQC chemical shifts upon titration with zyxin peptide. Thus, we tested binding of multi-FP4 (SEQ ID NO:46) motif-containing peptides to ENAH EVH1 domain with Arg47 mutated to Ala (ENAH R47A). While the affinities of single-FP4 (SEQ ID NO:46) motif peptides from ActA and PCARE were minimally affected by this mutation, peptides containing two FP4 (SEQ ID NO:46) motifs from zyxin, LPP, and NHSL1 experienced a 7-15-fold reduction in affinity to ENAH R47A relative to wild type, suggesting that these multi-FP4 (SEQ ID NO:46) peptides gain affinity by contacting the noncanonical site (Table 4, FIG. 3B).

We probed the extent to which binding affinity depended on the presence of multiple FP4 (SEQ ID NO:46) motifs. A 36-mer sequences from LPP and NHSL1 contain two FP4 (SEQ ID NO:46) motifs, and in both cases, truncating the peptide to leave only one motif reduced affinity 3-6-fold. Interestingly, the identity of the sequence between the two motifs is also important, as replacing this with a Gly-Ser linker in LPP led to a ~4-fold reduction in affinity (Table 1, FIG. 3C).

Figure 3:
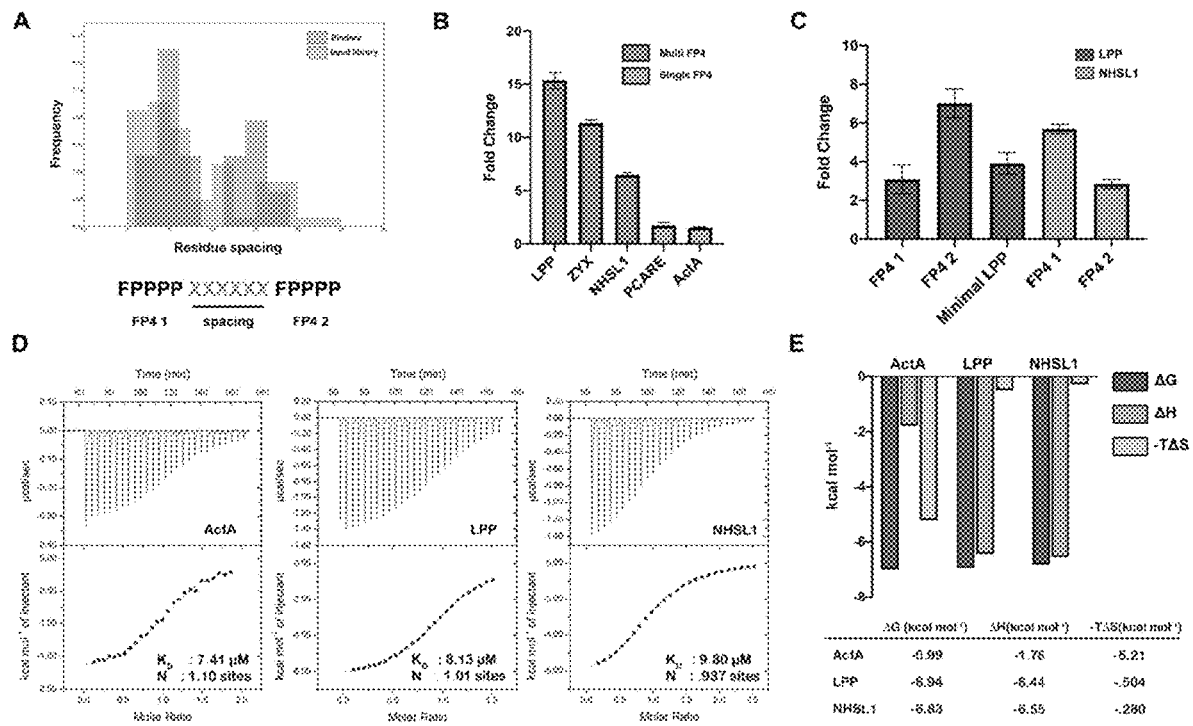
FIG. 3A-3E: Multiple FP4 (SEQ ID NO:46) motifs enhance peptide binding affinity. Sequences for peptides referenced in this figure are given in Tables S3, and S4. (A) Spacing of FP4 (SEQ ID NO:46) motifs in the input library ((SEQ ID NO:79)) and in high-confidence hits. (B) Fold change in $K_D$ for 36-mer peptides binding to Mena EVH1 R47A relative to Mena EVH1 WT. (C) Fold change in $K_D$ for peptide variants relative to 36-mer library peptides for LPP, NHSL1, or zyxin; see Table 1 for sequences. (D) ITC binding curves for 36-residue peptides from ActA, LPP, or NHSL1; (E) The entropic and enthalpic contributions to binding determined using data in panel D.

Using isothermal titration calorimetry (ITC), we confirmed that dual-motif peptides from LPP and NHSL1 and the single FP4 (SEQ ID NO:46) motif peptide from ActA fit well to a 1:1 binding model (FIG. 3D). Interestingly, the ITC analysis showed that binding of the ActA-derived single FP4 (SEQ ID NO:46) motif peptide was driven by favorable entropy, whereas binding of the NHSL1 and LPP dual-motif peptides was enthalpically driven. ActA, LPP, and NHSL1 peptides have similar binding free energies, but the entropic contribution in the dual motif interactions is ~10-fold less favorable (FIG. 3E). These data are consistent with a model in which long, disordered dual motif peptides pay an entropic penalty to wrap around the EVH1 domain and engage two sites and gain enthalpic binding energy from additional hydrogen bonds, electrostatic, and/or van der Waals interactions across the EVH1 interface.

Finally, we examined the motif-spacing requirements of bidentate binding. To estimate the minimum number of residues required to link a peptide bound in the canonical site to one in the noncanonical site, we generated a structure of the ENAH EVH1 domain bound to two FP4 (SEQ ID NO:46) peptides, using the binding poses in our ABI1-bound structure and structure 5NC7. We then used Rosetta to build a peptide chain to connect the two peptides. There are two different orientations for a peptide that links the FP4 (SEQ ID NO:46) motifs, depending on which site is bound by the N-terminal motif, as shown in FIG. 9. We found that in one case, 10 residues could span the two motifs, whereas 9 residues are sufficient in the other orientation (FIG. 9). This modelling puts approximate minimum bounds on the number of residues needed to span the two ENAH EVH1 sites that we propose are important for bidentate binding.

TABLE 1

Affinities of dual FP4 (SEQ ID NO: 46) motif peptide variants for ENAH EVH1 WT or ENAH EVH1 R47A.

| Name | Sequence | WT $K_D$ (µM) | R47A $K_D$ (µM) |
|---|---|---|---|
| NHSL1 36mer | ADRSPFLPPPPPV TDCSQGSPLPHSP VFPPPPPEAL (SEQ ID NO: 23) | 8.56 ± 2.00 | 55.4 ± 1.03 |
| NHSL1 FP4 1 | ADRSPFLPPPPPV TDCSQGSPLPHSP V (SEQ ID NO: 9) | 48.7 ± 3.98 | 99.1 ± 17.0 |
| NHSL1 FP4 2 | PVTDCSQGSPLPHS PVFPPPPPEAL (SEQ ID NO: 10) | 24.38 ± 1.19 | 51.0 ± 3.07 |

TABLE 1-continued

Affinities of dual FP4 (SEQ ID NO: 46) motif peptide variants for ENAH EVH1 WT or ENAH EVH1 R47A.

| Name | Sequence | WT $K_D$ (μM) | R47A $K_D$ (μM) |
|---|---|---|---|
| NHSL1 Duplicated | ADRSPFLPPPPPVT DCSQGSPLPHSPVP VTDCSQGSPLPHSP VFPPPPPEAL (SEQ ID NO: 11) | 18.4 ± .0637 | 70.0 ± 1.04 |
| LPP 36mer | KQPGGEGDFLPPPPP PLDDSSALPSISGNF PPPPPL (SEQ ID NO: 20) | 4.03 ± 3.00 | 61.9 ± 6.07 |
| LPP Minimal | GDFLPPPPPPLGGGS GSGGGSGSFPPPPPL* (SEQ ID NO: 13) | 15.8 ± 0.106 | 124 ± 29.7 |
| LPP FP4 1 | KQPGGEGDFLPPPPP PLDDSSALPSISGN (SEQ ID NO: 14) | 12.4 ± 0.269 | 61.3 ± .643 |
| LPP FP4 2 | PPLDDSSALPSISG NFPPPPPL (SEQ ID NO: 15) | 28.3 ± 0.870 | 75.2 ± 7.57 |
| LPP Duplicated | KQPGGEGDFLPPPPP PLDDSSALPSISGND DSSALPSISGNFPPP PPL* (SEQ ID NO: 16) | 6.66 ± .298 | 54.2 ± 2.74 |
| Minimum General | DFLPPPPGGGGGSG SGGGSGSFPPPPGG (SEQ ID NO: 17) | 92.6 ± 5.20 | 86.9 ± 14.6 |

TABLE 2

Dissociation constants of MassTitr peptides derived from human proteins

| Name | Sequence | $K_D$ (μM) |
|---|---|---|
| PCARE | AAKSEELSCEMEGNLEHLPPPPMEVLMDKSFASLES (SEQ ID NO: 18) | .192 ± .044 |
| ABI1 | FDDFPPPPPPPPVDYEDEEAAVVQYNDPYADGDPAW (SEQ ID NO: 19) | 2.44 ± .069 |
| LPP | KQPGGEGDFLPPPPPPLDDSSALPSISGNFPPPPPL (SEQ ID NO: 20) | 4.03 ± 3.00 |
| ZYX | ALGGAFPPPPPPIEESFPPAPLEEEIFPSPPPPPEE (SEQ ID NO: 21) | 4.79 ± 1.30 |
| ACTA | GFNAPATSEPSSFEFPPPPTEDELEIIRETASSLDS (SEQ ID NO: 22) | 5.21 ± 0.167 |
| NHSL1 | ADRSPFLPPPPPVTDCSQGSPLPHSPVFPPPPPEAL (SEQ ID NO: 23) | 8.56 ± 2.00 |
| SHROOM3 | VYSMDDFPPPPPHTVCEAQLDSEDPEGPRPSFNKLS (SEQ ID NO: 24) | 9.304 ± .01909 |
| ABI3 | SPPPPDEELPLPLDLPPPPPLDGDELGLPPPPPGFG (SEQ ID NO: 25) | 13.55 ± 1.909 |
| KIAAA1522 | PPAPEEQDLSMADFPPPPEEAFFSVASPEPAGPSGSP (SEQ ID NO: 26) | 13.99 ± .3253 |
| FBLIM1 | PPVLDGEDVLPDLDLPPPPPPPVLLPSEEEAPAP (SEQ ID NO: 27) | 16.03 ± .2899 |

TABLE 2-continued

Dissociation constants of MassTitr peptides derived from human proteins

| Name | Sequence | $K_D$ (μM) |
|---|---|---|
| TNK2 | TPVVDWDARPLPPPPAYDDVAQDEDDFEICSINSTL (SEQ ID NO: 28) | 21.25 ± .2263 |
| TJAP | PEEELPLPAFEKLNPYPTPSPPHPLYPGRRVIEFSE (SEQ ID NO: 29) | 23.91 ± .1414 |
| FYB1 | SGSGGIFPPPPDDDIYDGIEEEDADDGFPAPPKQLD (SEQ ID NO: 30) | 24.32 ± .6859 |
| NUTM2E | VVPVMAAQVVGGTQACEGGWSQGLPLPPPPPPAAQL (SEQ ID NO: 31) | 33.87 ± 1.230 |
| FHOD1 | SVPPPPPPPPPPIKGPFPPPPPLPLAAPLPHSVPD (SEQ ID NO: 32) | 50.44 ± 8.860 |
| SYNPO2 | KSPIADFPAPPPYSAVTPPPDAFSRGVSSPIAGPAQ (SEQ ID NO: 33) | 52.13 ± 4.865 |
| TENM1 | GSTQDVQSSPHNQFTFRPLPPPPPPPHACTCARKPP (SEQ ID NO: 34) | 62.86 ± 12.52 |

TABLE 3

Affinity of ABI1 truncation peptides

| Name | Sequence | $K_D$ (μM) |
|---|---|---|
| ABI1 36mer | FDDFPPPPPPPPVDYEDEEAAVVQYNDPYADGDPAW (SEQ ID NO: 35) | 4.01 ± 1.54 |
| ABI1 b | FDDFPPPPPPPPVDYEDEEAAV (SEQ ID NO: 36) | 3.93 ± 0.875 |
| ABI1 a | FDDFPPPPPPPPVDYED (SEQ ID NO: 37) | 5.21 ± 0.167 |
| ABI1 ala | FDDFPPPPPPPPVAYAA (SEQ ID NO: 38) | 8.47 ± 0.851 |
| FDDFP$_8$ | FDDFPPPPPPPP (SEQ ID NO: 39) | 10.05 ± 0.183 |
| FP$_8$ | FPPPPPPPP (SEQ ID NO: 6) | 28.5 ± 8.09 |
| FP$_4$S$_4$ | FPPPPSSSS (SEQ ID NO: 7) | 114.4 ± 6.86 |

TABLE 4

Comparison of affinities between ENAH WT or ENAH R47A against multi or single FP4 (SEQ ID NO: 46) motif peptides

| Name | Sequence | WT $K_D$ (μM) | R47A $K_D$ (μM) |
|---|---|---|---|
| PCARE | AAKSEELSCEMEGNLEHLPPPPMEVLMDKSFASLES (SEQ ID NO: 18) | .192 ± .044 | 0.331 ± .058 |
| LPP | KQPGGEGDFLPPPPPPLDDSSALPSISGNFPPPPPL (SEQ ID NO: 20) | 4.03 ± 3.00 | 61.9 ± 6.07 |
| ZYX | ALGGAFPPPPPPIEESFP PAPLEEEIFPSPPPPPEE (SEQ ID NO: 21) | 4.79 ± 1.30 | 54.45 ± 3.118 |
| ActA | GFNAPATSEPSSFEFPPPPTEDELEIIRETASSLDS (SEQ ID NO: 22) | 5.21 ± 0.167 | 8.019 ± 0.255 |
| NHSL1 | ADRSPFLPPPPPVTDCSQGSPLPHSPVFPPPPPEAL (SEQ ID NO: 23) | 8.56 ± 2.00 | 55.41 ± 1.032 |

Figure 4:
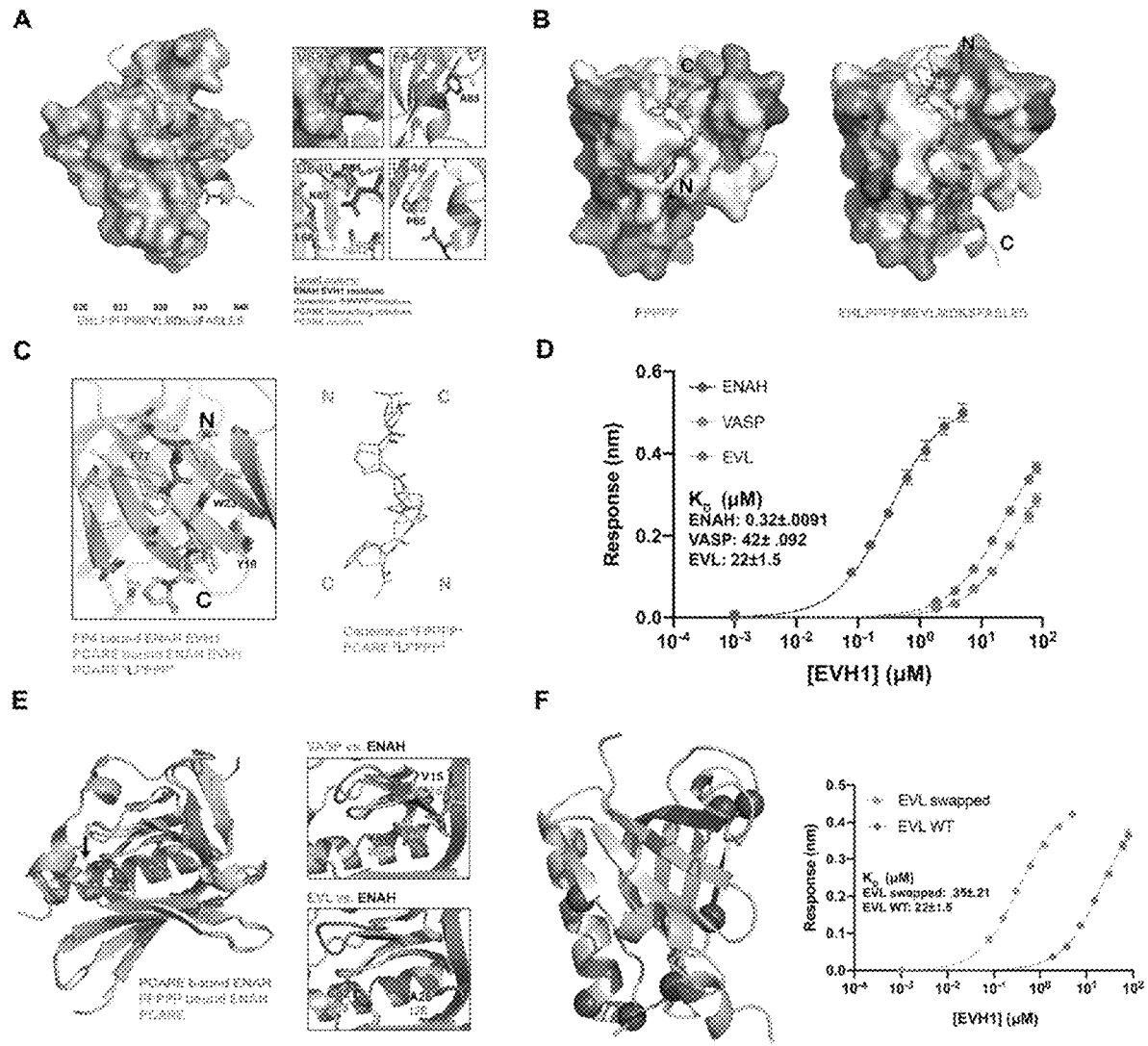
FIG. 4A-4F: A PCARE-derived peptide binds with high affinity and specificity to the ENAH EVH1 domain using a noncanonical binding mode. (A) Surface representation of ENAH EVH1 domain bound to the PCARE peptide EHLPPPPMEVLMDKSFASLES (SEQ ID NO:72). The $LP_4$ residues are light blue and other EVH1-interacting residues are green; insets show details of the interactions. (B) Surface representation of ENAH EVH1 highlighting conservation among Ena/VASP paralogs. Residues shared between all three paralogs—white; residues shared by two paralogs—orange, residues that differ in each paralog—red. On the left is ENAH EVH1 bound to $FP_4$ (SEQ ID NO:46) (PDB 1EVH); on the right is the ENAH EVH1 bound to the PCARE peptide (SEQ ID NO:72). (C) View comparing the orientations of a $FP_4$ (SEQ ID NO:46) peptide and the $LP_4$ (SEQ ID NO:45) region of PCARE. Side chains of the ENAH EVH1 domain are shown as sticks using tan for the $FP_4$ (SEQ ID NO:46) complex and grey for the PCARE complex. (D) BLI binding curves for PCARE B binding to ENAH, EVL, or VASP EVH1 domains. (E) Superposition of ENAH EVH1 domains bound to PCARE or $FP_4$ (SEQ ID NO:46) peptide (1EVH). The black arrow highlights a 3 Å shift in a loop that forms part of the binding pocket. Insets show residues that differ between ENAH and VASP or EVL near this loop. (F) ENAH EVH1 domain bound to PCARE peptide, with residues that were swapped into the EVL EVH1 domain to rescue affinity marked as purple spheres. On the right are binding curves for WT EVL EVH1 domain and residue-swapped EVL EVH1 domain binding to PCARE B.

Example 5: FP4 (SEQ ID NO:46) Motif Flanking Elements in Retinal Protein PCARE Confer High Affinity by Inducing Non-Canonical Binding The highest affinity peptide that we discovered was from PCARE, a retinal protein ($K_D$ 0.19 μM for 36-residue peptide PCARE[813-848]; Table 2). Successive truncations of this peptide identified the minimal region for high affinity binding (PCARE[826-848], which we call PCARE B, $K_D$=0.32 μM, FIG. 10A). To understand the structural basis behind the tight binding, we solved a crystal structure of ENAH EVH1 domain fused to the 36-mer PCARE sequence to 1.65 Å resolution. 21 residues of the 36-mer PCARE peptide were fully resolved in the electron density (PCARE[828-848]) and led to the surprising discovery that the PCARE's LPPPP (SEQ ID NO:45) motif binds in the opposite orientation from previously observed Ena/VASP EVH1 domains engaged with proline-rich peptides (FIG. 4A). With its core poly-proline motif bound in the opposite direction from what was expected, PCARE[828-848] uses a 14-residue alpha helix-rich extension C-terminal to the LPPPP (SEQ ID NO:45) motif to make additional contacts in a novel pocket on the EVH1 domain, explaining its high affinity.

PCARE residues Phe843 and Leu846 make hydrophobic interactions with Ala83 and Pro65 on ENAH. The side chain of Asp840 on PCARE docks into a polar pocket on ENAH made up of the backbone amines of ENAH Leu68, Lys69, and Arg81. Notably, the backbone amine and side chain of Ser842 on PCARE forms hydrogen bonds with the side chain of Asp840, correctly positioning Asp840 to hydrogen bond with a water molecule that is coordinated by the backbone amine of ENAH Arg81. Most intriguing is the interaction between Val837 on PCARE and the hydrophobic groove in ENAH that typically binds to FP4 (SEQ ID NO:46) motifs. Rather than using a large aromatic such as Phe to dock into this pocket, the alpha helical structure of PCARE positions the smaller Val837 in this site in an orientation entirely different from the way a canonical Phe binds in other complexes (FIG. 4A).

Example 6: PCARE Achieves Paralog Selectivity with a Novel FP4 (SEQ ID NO:46) Flanking Sequence Element by Stabilizing an ENAH EVH1 Domain Specific Conformation Next, we examined whether residues flanking FP4 (SEQ ID NO:46) SLiMs impact paralog specificity. Surprisingly, we found that PCARE B had a 70-140-fold preference for binding to ENAH over the VASP or EVL EVH1 domains (FIG. 4D). Consistent with the high sequence similarity of these proteins, our structure of ENAH EVH1 domain bound to PCARE$^{828-848}$ shows that most of the residues that PCARE contacts on ENAH are conserved in VASP and EVL (FIG. 4C). Interestingly, inspection of the ENAH-PCARE$^{828-848}$ complex shows that ENAH undergoes a conformational change upon binding, and we speculated that this might provide a mechanism for achieving specificity. When ENAH EVH1 domain binds to PCARE$^{828-848}$, a loop in ENAH (residues 80-86) shifts 3 Å relative to the ENAH bound to the ligand FPPPP (SEQ ID NO:46) (1EVH), leading to compression of ENAH's hydrophobic core. EVL and VASP have bulkier residues in this region, and modeling on the ENAH-PCARE$^{828-848}$ structure predicts severe steric clashes if EVL or VASP were to adopt the PCARE$^{828-848}$-bound conformation observed for ENAH (FIG. 4E). Structure gazing revealed hydrophobic core residues Y63/I26 in EVL (C62/A26 in ENAH) and W89/L15 in VASP (Y87/V15 in ENAH) to be incompatible with the PCARE$^{828-848}$-bound conformation, so we tested mutants of EVL and VASP in which these residues were replaced by those in ENAH (e.g. EVL Y63C, I26A and VASP W89Y, L15V). However, these changes were not sufficient to confer high affinity of binding of PCARE B on EVL or VASP, and we concluded that a broader set of residues must be involved.

To identify the network of residues responsible for ENAH's binding specificity, we used the structure-based modeling method dTERMen (design with TERM energies). dTERMen is a protocol for scoring the compatibility of a sequence with a structure based on the frequencies with which combinations of residues are found in compact tertiary motifs in known structures. We first scored the native EVL sequence on the PCARE$^{828-848}$-bound ENAH template with dTERMen, which scored considerably worse than the native ENAH sequence. Guided by the dTERMen score, we introduced increasing numbers of residues from ENAH into the sequence of EVL. Six replacements were sufficient to recapitulate dTERMen energies similar to that for ENAH in the PCARE$^{828-848}$-bound conformation. We made a mutated version of EVL with the 6 corresponding residues from ENAH, also including the I26A mutation in EVL as mentioned above. The replaced residues are distributed across the EVH1 domain, and several are distant from the PCARE$^{828-848}$ binding site (FIG. 4F). This EVL mutant (EVL swapped) bound as tightly to PCARE B as ENAH does ($K_D$=0.35 vs. 0.32 µM) (FIG. 4F). Wild-type EVL and ENAH differ at 29 sites, and there are 1.56 million potential residue swaps of 7 residues, so it is notable that dTERMen was able to identify the correct combination of residues to transfer binding specificity.

Figure 5:
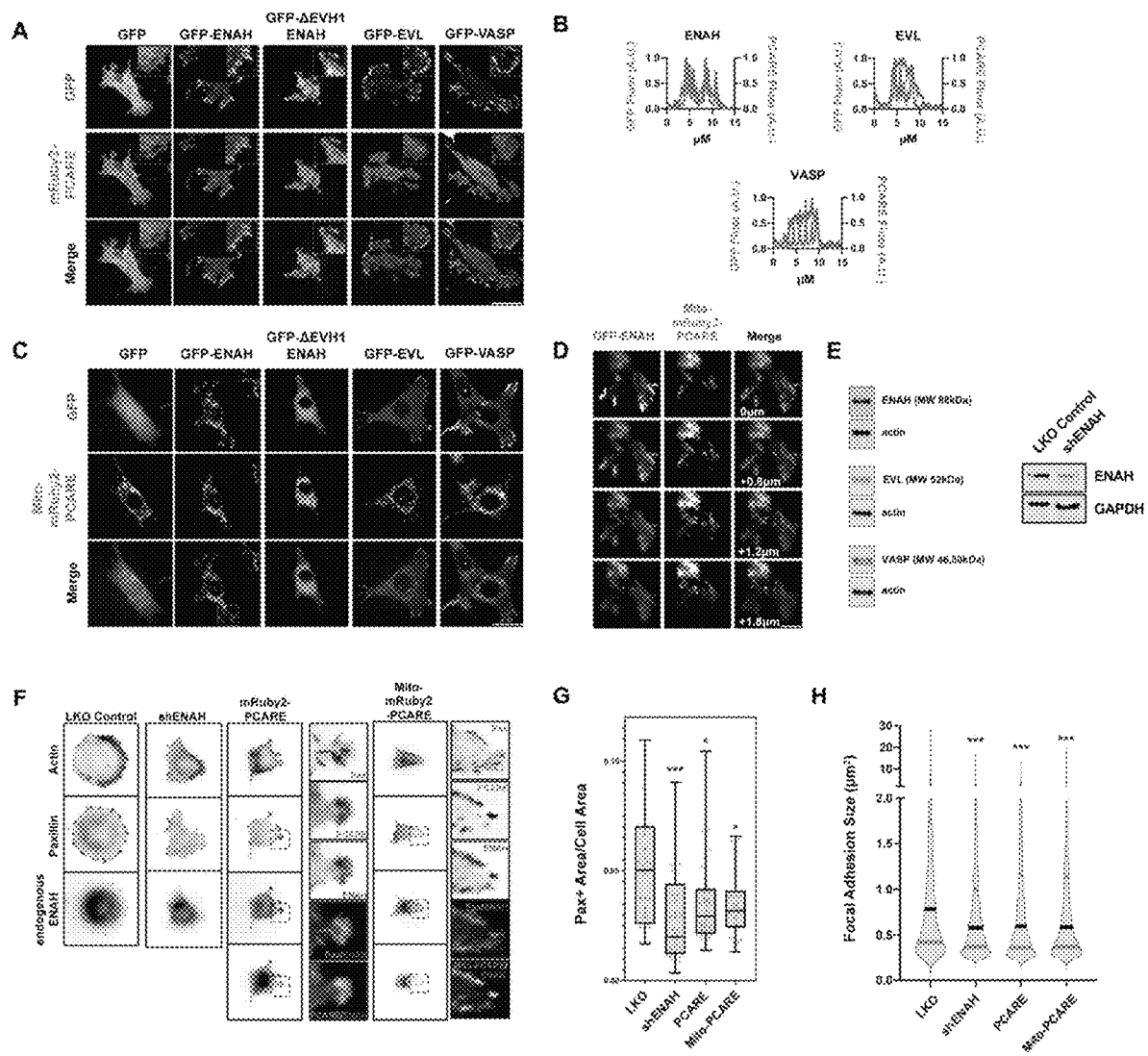
FIG. 5A-5H: A PCARE-derived peptide selectively recruits ENAH in cells. (A) Live $MVD7_{shEVL}$ cells expressing mRuby2-PCARE with GFP, GFP-ENAH, GFP-ΔEVH1-ENAH, GFP-EVL, or GFP-VASP, and imaged using TIRF microscopy. Red arrow indicates the position of the fluorescence intensity line plot in (B) Scale bar=25 m. (B) Normalized fluorescence intensity of GFP signal (left axis) and mRuby2-PCARE signal (right axis) along a line drawn through focal adhesions, indicated by red arrow in (A). (C) Live $MVD7_{shEVL}$ cells expressing Mito-mRuby2-PCARE with GFP, GFP-ENAH, GFP-dEVH1-ENAH, GFP-EVL, or GFP-VASP. Image is a maximum intensity projection of z-stack acquired using widefield fluorescence microscopy. Box indicates the position of the magnified region of interest in (D) Scale bar=25 μm. (D) Magnified region of interest indicated by box in (C), showing co-localization of Mito-mRuby2-PCARE and GFP-ENAH at increasing depths in the cell. Scale bar=5 μm. (E) At left, representative western blot showing expression of ENAH, EVL, and VASP in MCF7 cells. At right, representative western blot showing magnitude of knockdown using ENAH-targeted shRNA. (F) Immunofluorescence labeling of MCF7 cells expressing non-targeting LKO control, ENAH-targeting shRNA, mRuby2-PCARE, or Mito-mRuby2-PCARE. Cells were fixed eight hours after plating, and immunolabeled for focal adhesion marker paxillin and endogenous ENAH, and additionally stained with phalloidin for F-actin. Box indicates positions of magnified regions of interest (ROI). Scale bar=25 μm, magnified ROI scale bar=5 μm. (G) Box-and-whisker plot of total paxillin-positive area per cell normalized to total cell area, for indicated conditions. N=3 biological replicates, n=45-49 cells (H) Violin plot of individual focal adhesion size (for adhesions greater than 0.25 m²) for indicated conditions. Central black line indicates median, peripheral gray lines indicate interquartile range. N=3 biological replicates, n=1452-2159 individual adhesions

Example 7: PCARE Binds Selectively to ENAH in Cells and can Inhibit ENAH-Dependent Cell Adhesion To test whether a PCARE-derived peptide could selectively bind to ENAH in cells, we used Ena/VASP family-deficient cell line MV$^{D7}$ (Bear 2000) and expressed individual paralogs ENAH, EVL, and VASP to evaluate interactions with PCARE. MV$^{D7}$ are embryonic fibroblasts derived from Enah$^{-/-}$ Vasp$^{-/-}$ mice, with low Evl expression (Auerbach 2003, Damiano-Guercio 2020). As Ena/VASP family members are known to heterotetramerize (Riquelme 2015), we used an shRNA against Evl to provide a clean background (average knockdown of MV$^{D7}_{shEVL}$ versus MV$^{D7}$ 42.8+/−1.8% by qPCR, 3 biological replicates). We cloned the PCARE peptide sequence (PCARE$^{822-848}$) into a lentiviral expression vector, tagging the N-terminus with mRuby2 and a disordered linker to enable visualization (mRuby2-PCARE). mRuby2-PCARE was co-expressed with GFP, GFP-tagged ENAH, an EVH1 deletion mutant (ΔEVH1-ENAH), EVL, or VASP. ENAH, EVL, and VASP all robustly localized to focal adhesions, while GFP and ΔEVH1-ENAH were largely cytoplasmic. mRuby2-PCARE exhibited diffuse cytoplasmic localization under all conditions except when co-expressed with ENAH, in which case mRuby2-PCARE was moderately recruited to focal adhesions (FIG. 5A). Plots of fluorescence intensity along a line passing through focal adhesions show specific co-localization of PCARE and ENAH (FIG. 5B).

To determine if PCARE is capable of disrupting ENAH localization and to further explore the PCARE-ENAH interaction in cells, we tagged PCARE$^{822-848}$ with a mitochondrial localization sequence, generating Mito-mRuby2-PCARE. In MV$^{D7}_{shEVL}$ cells with reconstituted Ena/VASP paralogs, exogenously expressed ENAH was strongly enriched at both focal adhesions and at mitochondria, while EVL and VASP remained entirely localized to focal adhesions (FIGS. 5C, D). Together, these findings indicate that PCARE interacts specifically with ENAH and is capable of recruiting ENAH away from its normal functional sites.

Finally, we sought to determine whether expression of cytosolic or mitochondria-targeted PCARE$^{822-848}$ peptide could disrupt ENAH-mediated cell adhesion. We examined early focal adhesion maturation in the breast cancer cell line MCF7 (FIG. 5E) by performing immunofluorescence labelling for the focal adhesion marker paxillin and endogenous ENAH. We compared PCARE$^{822-848}$ inhibition of EVH1-dependent activities to the loss of ENAH induced by shRNA directed against ENAH (FIG. 5E). Eight hours after plating, shENAH MCF7 cells demonstrated adhesion defects, and developed smaller focal adhesions compared to non-targeting shRNA controls. Additionally, endogenous ENAH was no longer detectable at focal adhesions in knockdown cells (FIGS. 5F-H).

Intriguingly, cytoplasmic expression of PCARE$^{822-848}$ in MCF7 cells not only resulted in smaller, ENAH-negative adhesions compared to controls, but frequently colocalized with endogenous ENAH at lamellipodia-like protrusions. These protrusive phenotypes were not observed in MCF7 cells expressing Mito-PCARE$^{822-848}$, which also manifested FA defects, as well as recruitment of endogenous ENAH to the mitochondria. This suggests that in MCF7 cells, blockade of the EVH1 domain by cytosolic PCARE[822-848] liberates ENAH from focal adhesions, while permitting other ENAH-dependent functions elsewhere in the cell. In contrast, Mito-PCARE[822-848] serves to sink ENAH away from its normal sites of action at focal adhesions and at the cell membrane.

Figure 6:
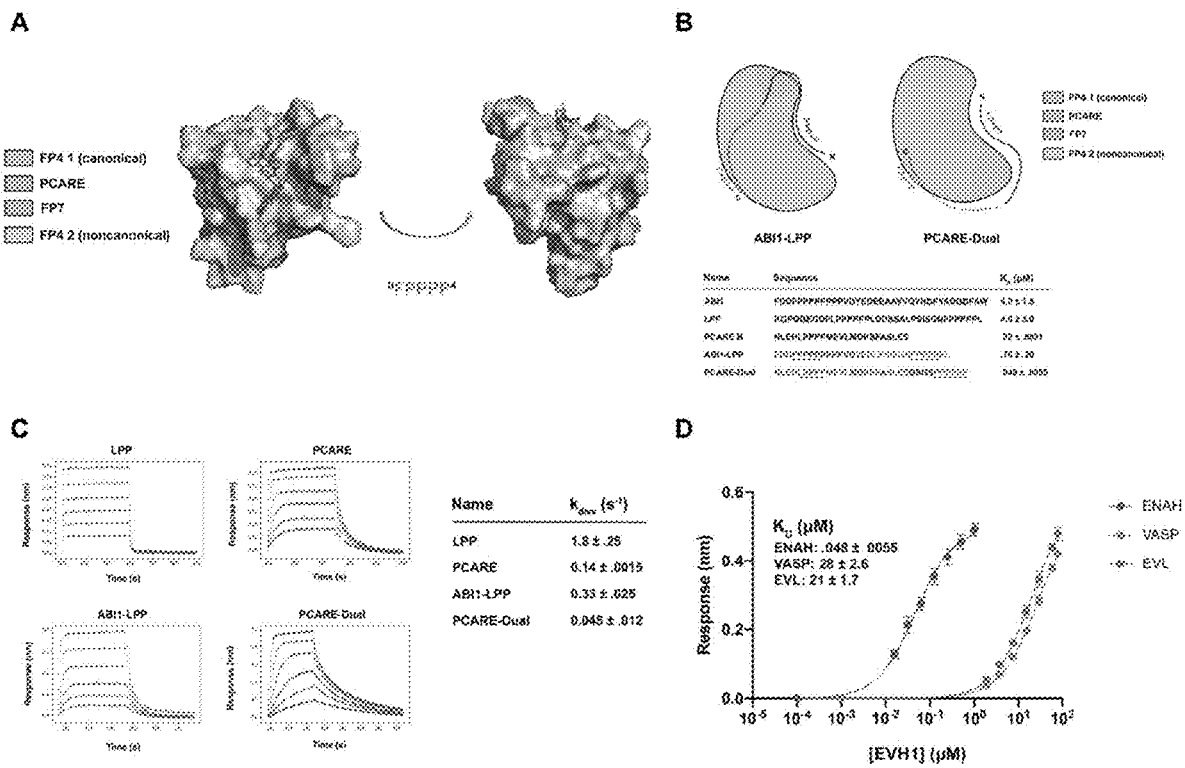
FIG. 6A-6D: Engineered peptides bind to the ENAH EVH1 domain with high affinity and specificity (A) Surface representation of the ENAH EVH1 with binding sites characterized in this study indicated. Also indicated is (SEQ ID NO:46). (B) Design scheme for high affinity binders ABI1-LPP (SEQ ID NO:5) and PCARE-Dual (SEQ ID NO:4). Other binders as depicted are ABI1 (SEQ ID NO:19), LPP (SEQ ID NO:20) and PCARE B (SEQ ID NO:2). (C) Peptide binding and dissociation curves measured by BLI. Blue, orange, green, red, purple, and brown curves denote EVH1 concentrations in descending order. For LPP: 80, 36, 16, 7.0, 3.1, 1.4 μM. PCARE: 1.25, 0.63, 0.31, 0.16, 0.078, 0.039 μM. ABI1-LPP: 2.5, 1.3, 0.63, 0.31, 0.16, 0.078 μM. PCARE-Dual: 0.50, 0.25, 0.0625, 0.031, 0.016, 0.0078 μM. (D) BLI response curves for PCARE-Dual binding to the ENAH, VASP, or EVL EVH1 domains.

Example 8: Engineered Binders Engage ENAH EVH1 Domain with Increased Affinity and Specificity Based on our results demonstrating a PCARE-derived peptide could selectively recruit and inhibit ENAH-dependent functions in cells, we sought to engineer higher affinity peptides to be used either as inhibitors against ENAH, an attractive therapeutic target for cancer metastasis, or as tools to study Ena/VASP biology. We integrated what we learned about peptide features that promote binding of native proteins to ENAH and took a rational design approach to making even tighter-binding designed peptides. With the goal of combining peptide elements to target multiple sites along the ENAH EVH1 domain (FIG. 6A), we first fused the ABI1 FP8 (SEQ ID NO:6) motif, along with its acidic flanking sequence, to a sequence derived from LPP that includes part of the LPP linker and a second FP4 (SEQ ID NO:46) motif (ABI1-LPP; FIG. 6B). Our rationale was that the high affinity ABI1 sequence would occupy the canonical FP4 (SEQ ID NO:46) binding site and the LPP linker would wrap along the surface of the EVH1 domain and position a second FP4 (SEQ ID NO:46) motif near the noncanonical FP4 (SEQ ID NO:46) site. The ABI1-LPP fusion peptide bound tighter ($K_D$=0.76 µM) than did peptides corresponding to its constituent parts (FIG. 6B). We also designed a peptide that fused the high affinity PCARE B sequence, via a short linker, to a second FP4 (SEQ ID NO:46) motif designed to induce bivalent binding. Peptide PCARE-Dual bound ~7-fold tighter than PCARE B, with $K_D$=50 nM, providing the tightest known binder of the ENAH EVH1 domain to date (FIG. 6B). The enhancements in affinity for ABI1-LPP and PCARE-Dual come from decreases in off-rate, with PCARE-Dual dissociating ~100-fold slower than dual-motif peptide LPP (FIG. 6C). Finally, we found that PCARE-Dual is 400-600-fold selective for ENAH over EVL and VASP, even though VASP is also known to have a noncanonical binding site that can engage a second FP4 (SEQ ID NO:46) motif (FIG. 6D). These exciting results demonstrate how our new knowledge of affinity/specificity-enhancing SLiM flanking elements, derived from screening natural sequences, can drive the design of synthetic inhibitors with the potential to be used as research tools and/or therapies.

Materials and Methods for the Examples

FACS Sample Preparation and Analysis

The general protocol for sample preparation for FACS analysis and Mass-Titr sorting was as follows: 5 mL cell cultures of eCPX plasmid expressing either library or control peptide was grown overnight at 37° C. in LB+25 µg/ml chloramphenicol+0.2% w/v glucose. The next day, the O.D. 600 of the cultures were measured. Enough cells for 100 µL of an O.D. 600 of 6.0 were pelleted and inoculated into fresh TB+25 µg/mL chloramphenicol and grown at 37° C. Upon reaching an O.D. 600 of 0.5-0.6, cells were induced with 0.04% w/v arabinose and induced for 1.5 hours at 37° C. The O.D. 600 was then remeasured, and enough cells were pelleted for analysis (1×10$^7$ cells per FACS analysis sample, 7×10$^7$ cells for library sorting). Cells were resuspended to a concentration of 4×10$^8$ cells/mL, washed in PBS+0.1% BSA, and then incubated with anti-FLAG antibody conjugated to APC (Q FLAG-APC; PerkinElmer) diluted 1:100 in PBS+0.1% BSA at a ratio of 30 µL labelled antibody:10$^7$ cells. Cells wrapped in foil were incubated at 4° C. for 15 minutes, washed with PBS+0.1% BSA, and pelleted. For each FACS analysis sample, 25 µL of 1×10$^7$ cells in PBS were mixed with 25 µL of a 2× concentration of Mena tetramer in PBS+1% BSA+4 mM DTT (final concentration of 2 mM DTT), and then incubated at 4° C. for 1 hour in foil. After incubation, 50 µL of the mixture was added per well to a 96-well Multi-Screen HTS GV sterile filtration plate (Millipore), buffer was removed by vacuum, and then cells were washed twice with 200 µL of PBS+0.5% BSA. Each well containing 1×10$^7$ cells was then resuspended in 30 µL of streptavidin-PE (SAV-PE; ThermoFisher Scientific) diluted 1:100 in PBS+0.1% BSA, and incubated for 15 minutes at 4° C., washed with 200 µL of PBS+0.1% BSA, and resuspended in 250 µL of PBS+0.1% BSA for subsequent FACS analysis or sorting.

Biolayer Interferometry (BLI)

All BLI experiments were performed with 2 replicates on an Octet Red96 instrument (ForteBio). Biotinylated, 6×-His-Sumo-peptide fusions purified in small scale were diluted into BLI buffer (PBS pH 7.4, 1% BSA, 0.1% Tween-20, 1 mM DTT) and immobilized onto streptavidin-coated tips (ForteBio) until loading reached a response level between 0.5-0.6 nm. The loaded tips were immersed in a solution of ENAH EVH1 domain at a relevant dilution series in BLI buffer at an orbital shake speed of 1000 rpm and run until the binding signal plateaued. ENAH-bound tips were subsequently placed into BLI buffer only for dissociation and run until the binding signal plateaued. $K_D$ values were obtained through steady state analysis. Briefly, the data were corrected for background by subtracting the signal obtained when doing the same experiment using a biotinylated, 6×-His Sumo instead of an immobilized ENAH-binding peptide. The association phases were then fit to a one-phase binding model in Prism and the equilibrium steady-state binding signal values from that fit were plotted against ENAH concentration and fit to a single-site specific binding model in Prism to obtain dissociation constants. Errors reported are the standard deviation of two replicates.

Isothermal Titration Calorimetry (ITC)

ITC experiments were performed with two replicates using a VP-ITC microcalorimeter (MicroCal LLC). To prepare samples for ITC, 2.5 mL of 100 µM ENAH EVH1 domain and 1 mL of 800 µM-1.2 mM of SUMO-peptide fusions were dialyzed against 2 µL of ITC Buffer (20 mM Hepes pH 7.6, 150 mM NaCl, 1 mM TCEP) at 4° C. overnight. The concentrations of proteins were remeasured after dialysis on the day of experiment. SUMO-peptide was titrated into ENAH EVH1 domain at 25° C. Data analysis and curve fitting were performed with the Origin 7.0 software (OriginLab). Errors reported as the standard deviation of two replicates.

Crystallography

Crystals of ENAH fused to ABI1 were grown in hanging drops over a reservoir containing 0.1 M Sodium Acetate pH 4.5 and 2.9 M NaCl. 1 µL of ENAH-ABI1 (250 µM in 20 mM Hepes, 150 mM NaCl, 1 mM DTT) was mixed with 1 µL of reservoir solution, and 3D crystals appeared in two weeks. Crystals of ENAH fused to PCARE were grown in hanging drops containing 0.1M Tris pH 8.0 and 3.30 M NaCl. 1.5 µL of ENAH-PCARE (769 µM in 20 mM Hepes, 150 mM NaCl, 1 mM DTT) were mixed with 0.5 µL of reservoir solution, and football shaped crystals appeared in two days. Both crystals were grown at room temperature. Diffraction data were collected at the Advanced Photon Source at Argonne National Laboratory, NE-CAT beamline 24-IDE. The ENAH-ABI1 and ENAH-PCARE integrated and scaled to 1.88 Å and 1.65 Å with HKL2000 and the structures were solved with molecular replacement using either ENAH EVH1 structures 5NC7 or 6RD2 as search models respectively. Structures were refined with iterative rounds of model rebuilding with PHENIX and COOT.

Cell Culture

MCF7 and HEK293T cells were cultured in high-glucose Dulbecco's modified Eagle's medium (DMEM) base media with sodium pyruvate (Corning) supplemented with 10% fetal bovine serum (FBS; Millipore), 2 mM L-glutamine (Corning), and 100 U/mL penicillin with 100 µg/mL streptomycin (Corning). $MV^{D7}$ cells were cultured in high-glucose DMEM supplemented with 15% FBS, 2 mM L-glutamine, 100 U/mL mouse interferon-γ(Millipore). MCF7 and HEK293T cells were maintained in a 37° C. humidified incubator under 5% $CO_2$. $MV^{D7}$ cells were maintained in a 32° C. humidified incubator under 5% $CO_2$. For lentiviral production, second generation lentiviral particles were generated by PEI transfection of 293T cells with transfer plasmid, pMD2.G, and psPAX2 (Addgene #12259, #12260, gifts from Didier Trono). HEK293T media containing lentiviral particles was collected, filtered, and added directly to cultures with polybrene (Gibco). Puromycin (2 µg/mL final concentration; Thermo Fisher) and blasticidin (4 µg/mL final; Gibco) were used to select for cells stably expressing shRNA sequences or Ena/VASP constructs, respectively, after lentiviral transduction. For immunofluorescence experiments, MCF7 cells were cultured on fibronectin-coated coverslips (10 µg/mL; Corning). For live-cell imaging ($MV^{D7}$), cells were cultured in fibronectin-coated glass-bottom dishes (Mattek).

Reverse Transcription Quantitative PCR (RT-qPCR)

To assess Evl knockdown in $MV^{D7}$, total cellular RNA was isolated using the Isolate II RNA kit (Bioline) according to manufacturer's instructions. cDNA was synthesized from 1000 ng of input RNA using qScript cDNA Synthesis kit (Quantabio). RT-qPCR reactions were run in duplicate on an ABI 7500 Fast Real-Time PCR System (Applied Biosystems) with PowerTrack SYBR Green Master Mix (Thermo Fisher). Primer pairs were confirmed to have 85-110% efficiency based on the slope of the standard curve from a cDNA dilution series. $C_T$s were normalized to the $C_T$ GAPDH housekeeping genes. Percent knockdown was determined using the comparative $C_T$ method. *Mus musculus* Gapdh Fwd AGGTCGGTGTGAACGGATTTG (SEQ ID NO:47), Rev GGGGTCGTTGATGGCAACA (SEQ ID NO:48). Evl Fwd TGAGAGCCAAACGGAAGACC (SEQ ID NO:49), Rev TTCTGGACAGCAACGAGGAC (SEQ ID NO:50).

Western Blotting

Cells were lysed in buffer containing 140 mM NaCl, 10 mM Tris pH 8.0, 1 mM EDTA, 0.5 mM EGTA, 1% Triton X-100, 0.1% sodium deoxycholate, and 0.1% SDS with protease and phosphatase inhibitors (Boston Bio Products), Samples were resolved by SDS-PAGE and transferred onto nitrocellulose membranes, Membranes were blocked in Odyssey Blocking Buffer (LI-COR) for 1 hour and incubated at 4° C. overnight with primary antibodies. Primary antibodies were used as follows: mouse Actin 1:2500 (ProteinTech Group, 66009-1-Ig), mouse GAPDH 1:1000 (Cell Signaling Technology, 5174S), rabbit ENAH 1:250 (Sigma, HPA028696), rabbit EVL 1:1000 (Sigma, HPA018849), rabbit VASP 1:1000 (Cell Signaling Technology, 3132S). Membranes were incubated with secondary antibodies conjugated to either Alexa Fluor 680 or 790 (Themo Fisher) for 1 hour. Immunoblots were scanned using Odyssey CLx imager (LI-COR).

Immunofluorescence

MCF7 cells were fixed and immunolabeled 8 hours after plating onto fibronectin (10 µg/mL; Corning) coated coverslips to assay focal adhesions. Cells were fixed with 4% paraformaldehyde (PFA; Electron Microscopy Services) with 0.075 mg/mL saponin (Alfa Aesar, Sigma) diluted in phosphate-buffered saline (PBS) at 37° C. for 10 minutes. PFA was quenched with 100 mM glycine in PBS at room temperature for 10 minutes. Cells were then blocked in 1% BSA and 1% FBS in PBS either overnight at 4° C. or for 1 hour at room temperature. The following immunofluorescence reagents and antibodies were used: mouse anti-Paxillin (1:200, clone: 349; BD Biosciences, 612405), rabbit anti-ENAH (1:100; HPA028448, Sigma), goat anti-mouse Alexa Fluor 488 and Alexa Fluor 647 (1:1000, Thermo Fisher), donkey anti-rabbit Alexa Fluor 405 (Abcam), and Alexa Fluor 488- and Alexa Fluor 647-Phalloidin (1:40, Thermo Fisher). Primary antibodies were diluted in block solution and incubated for 1.5 hours at room temperature. After washing, coverslips were incubated for 1 hour in secondary antibody solution with fluorescently-labelled phalloidin. Coverslips were mounted using ProLong Gold Antifade (Invitrogen) and allowed to cure for at least 24 hours before imaging.

Microscopy and Image Analysis

Cells were imaged on a Ti-E inverted microscope (Nikon), with a 100× Apo TIRF 1.49 NA objective (Nikon) and an ORCA-Flash 4.0 V2 CMOS camera (Hamamatsu). For focal adhesion assessment, cells were imaged with total internal reflection fluorescence (TIRF) microscopy. To increase the depth of imaging for examination of mitochondrial localization, standard widefield fluorescence microscopy was used. Focal adhesion quantification was performed as previously described (Puleo 2019). Briefly, a binary mask was generated for paxillin signal and actin signal, denoting focal adhesions and cell area, respectively. To facilitate semi-automated segmentation of focal adhesions, we generated a sharp, high contrast image of the paxillin and actin channels by the following processing steps: deconvolution using 5 iterations of the Richardson-Lucy algorithm, shading correction using rolling ball, and unsharp masked (NIS Elements). Focal adhesion area was quantified by measuring the paxillin area of each cell within the whole cell area, or by examining individual focal adhesions. Each experimental condition was performed in triplicate and plotted together. Images presented in figures have been lightly processed in NIS Elements, including by applying 2 iterations of the Richardson-Lucy deconvolution algorithm and rolling ball shading correction to reduce background in live cell images.

Protein Constructs Purification:

Human ENAH EVH1 domain, followed by a 6×-Gly linker and ENAH mouse coiled coil (for tetramerization), were cloned into a pDW363 biotinylation vector that includes a C-terminal biotin acceptor peptide (BAP) tag and a 6×-His tag. This ENAH tetramer construct was expressed in Rosetta2(DE3) (Novagen) cells in Terrific Broth (TB) with 100 µg/mL ampicillin, 25 µg/mL chloramphenicol, and 0.050 mM D-(+)-biotin (for in vivo biotinylation). Cells were grown at 37° C. with shaking to an optical density at 600 nm (O.D. 600) of 0.5-0.7 and then induced with 1 mM IPTG and grown at 37° C. for 5 hours. 1 L of cells were then spun down and resuspended in 25 mL of binding buffer (20 mM Tris pH 8.0, 500 mM NaCl, 5 mM imidazole), and frozen at −80° C. overnight. The next day, pellets were thawed and supplemented with 20 mM phenylmethylsulfonyl fluoride (PMSF) protease inhibitor. Cells were sonicated ten times for 30 s followed by 30 s of rest on ice and centrifuged. The clarified lysate was filtered through a 0.2 m filter and applied to 2 mL of Ni-nitrilotriacetic (Ni-NTA) acid agarose resin (GoldBio) equilibrated in wash buffer (20 mM Tris pH 8.0, 500 mM NaCl, 20 mM imidazole). The resin was then washed 3 times with 8 mL wash buffer and eluted with 10 mL of elution buffer (20 mM Tris pH 8.0, 500 mM NaCl, 300 mM imidazole). The elution was run through a S75 26/60 size exclusion column equilibrated in gel filtration buffer (20 mM Tris pH 8.0, 150 mM NaCl, 1 mM DTT, 10% glycerol). Purity was verified by SDS-PAGE, and the fractions were pooled, concentrated, and flash frozen at −80° C.

Monomeric ENAH, EVL, or VASP EVH1 domains for use in BLI and ITC experiments, or ENAH EVH1-peptide fusions for crystallography was cloned into a pMCSG7 vector (gift from Frank Gertler, MIT), which places a 6×-His and TEV cleavage tag N-terminal to the EVH1 domain. These constructs were transformed into Rosetta2(DE3) cells and grown in 2×YT media supplemented with 100 μg/mL ampicillin. Cells were grown while shaking at 37° C. to an O.D. 600 of 0.5-0.7, and then cooled on ice for at least 20 minutes. They were then induced with 0.5 mM IPTG and grown while shaking at 18° C. overnight. Induced cultures were resuspended in 25 mL of wash buffer (20 mM Hepes pH 7.6, 500 mM NaCl, 20 mM imidazole) and frozen at −80° C. overnight. The next day, cultures were sonicated, spun down, and applied to Ni-NTA acid agarose resin equilibrated with wash buffer, and washed as described above. Samples were eluted in 10 mL elution buffer (20 mM Hepes pH 7.6, 500 mM NaCl, 30 mM imidazole). TEV protease was added to the elution at a ratio of 1 mg TEV:50 mg tagged protein along with 1 mM DTT. This mixture was dialyzed against TEV cleavage buffer (50 mM Hepes pH 8.0, 300 mM NaCl, 5 mM DTT, 1 mM EDTA) at 4° C. overnight and then applied over Ni-NTA acid agarose resin equilibrated with wash buffer. The column was washed with 2×8 mL of wash buffer, and the resulting flow-through and washes were pooled, concentrated, and applied to an S75 26/60 column equilibrated in gel filtration buffer (20 mM Hepes pH 7.6, 150 mM NaCl, 1 mM DTT, 1% glycerol). Purity was verified by SDS-PAGE and combined fractions were concentrated and flash frozen at −80° C.

SUMO-peptide fusions were cloned into a pDW363 vector that appends a BAP and 6×-His tag to the N-terminus of the protein and transformed into Rosetta2(DE3) cells. For ITC experiments, these cells were expressed in TB supplemented with 100 μg/mL ampicillin, grown to an O.D. 600 of 0.5-0.7, and induced with 1 mM IPTG. Induced cultures were purified as described above for the pMCGS7 constructs, with the exception of the TEV cleavage step. Instead, after elution with elution buffer, the sample was directly applied to the S75 26/60 column equilibrated in gel filtration buffer. Fractions were pooled, concentrated, and flash frozen at −80° C.

Small Scale Protein Purification for Biolayer Interferometry

Rosetta2(DE3) cells (Novagen) were transformed with pDW363 vector encoding 6×-His-SUMO-peptide fusions and grown in 20 mL of LB+100 μg/mL Ampicillin+0.050 mM D-(+)-Biotin dissolved in DMSO for in vivo biotinylation. Cells were grown to an OD of 0.5-0.7 with 1 mM IPTG and induced for 4-6 hours at 37° C. Pellets were spun down and frozen and −80° C. for at least 2 hours. These pellets were then thawed and resuspended in B-PER reagent (ThermoFisher) at 4 mL/gram of pellet with 0.2 mM PMSF. This suspension was shaken at 25° C. for 10-15 minutes, and then spun down at 15,000 g for 10 minutes. The supernatant was applied to 250 μL of Ni-NTA acid agarose resin equilibrated in 20 mM Tris pH 8.0, 500 mM NaCl, 20 mM Imidazole (Buffer A), and then washed 3 times with 1 mL of this buffer. Peptides were eluted in 1.8 mL of 20 mM Tris pH 8.0, 500 mM NaCl, 300 mM imidazole to use in BLI assays.

Bacterial Cell Surface Display Plasmids and T7-Pep Library Cloning

Control peptides for display were expressed at the C-terminus of eCPX in a vector designed by the Daughtery group. This construct was modified to include a FLAG tag at the N-terminus of the peptide and a C-myc tag at the C-terminus. The T7-pep library plasmids (gift from Elledge lab, Harvard), were transformed into Pir1 cells (Thermofisher), grown, and miniprepped (Qiagen) to isolate the library plasmid. Plasmids were then cut with EcoRI (NEB) and XhoI (NEB), and the inserts were gel purified, combined and concentrated with a Zymo Clean and Concentrate column, and eluted with 50 μL of sterile MilliQ Water. To clone the T7-pep library into the eCPX vector, we first grew up 200 mL of an empty eCPX vector in DH5a cells at 37° C. overnight. This culture was miniprepped (Qiagen) and then digested with EcoI and XhoI at a ratio of 10 units of enzyme:1 μg of vector at 37° C. for 2 hours. The resulting digest was PCR purified and eluted with 40 μL water. This cut vector was then dephosphorylated with Antarctic phosphatase (NEB) at a ratio of 1 μL/1 μg of DNA at 37° C. for 2 hours, followed by 10 min at 65° C. for enzyme inactivation. T7-pep library insert was ligated into the cut eCPX vector using T4 ligase (NEB) at 14° C. overnight. Ligase was subsequently deactivated for 10 minutes at 70° C., and the ligation reaction was concentrated with Zymo Clean and Concentrate columns (Zymo Research). Each column was eluted with 12.5 μL elution buffer (from kit). The resulting elutions were desalted on a 0.025 m filter (Millipore) for 15-20 minutes and pooled on ice. Electrocompetent MC1061 cells and 10-20 μL DNA were then mixed and transferred to a cold 2 mm cuvette (BioRad). Each cuvette was pulsed at 2.5 kV, 50 μF, 100 ohms on an electroporator (BioRad), immediately rinsed out with 3×1 mL of warm SOC and transferred to a culture tube containing 7 mL warm SOC. Cells were incubated at 37° C. for one hour, and then combined. Serial dilutions of the library were plated on LB/chloramphenicol plates to assess transformation efficiency, and the leftover cells were added to 500 mL of LB+25 μg/mL chloramphenicol+0.2% w/v sterile-filtered glucose. The library was grown at 37° C. until it reached an O.D. 600 of 2.0 and then frozen as glycerol stocks to use for FACS analysis and sorting.

```
Construct sequences
pDW363 constructs:
Constructs used for bacterial display
ENAH tetramer
                                    (SEQ ID NO: 51)
MSEQSICQARAAVMVYDDANKKWVPAGGSTGFSRVHIYH

HTGNNTFRVVGRKIQDHQVVINCAIPKGLKYNQATQTFHQ

WRDARQVYGLNFGSKEDANVFASAMMHALEVLNSQEAGGG
```

```
GGGGSACEGLDYDRLKQDILDEMRKELAKLKEELIDAIRQ

ELSKSNTAGSGSGSGLNDIFEAQKIEWHEDTGGSSHHHHH

HG*.

Cysteine-less ENAH tetramer
                                (SEQ ID NO: 52)
MSEQSIAQARAAVMVYDDANKKWVPAGGSTGFSRVHIYH

HTGNNTFRVVGRKIQDHQVVINSAIPKGLKYNQATQTFHQ

WRDARQVYGLNFGSKEDANVFASAMMHALEVLNSQEAGGG

GGGGSASEGLDYDRLKQDILDEMRKELAKLKEELIDAIRQ

ELSKSNTAGSGSGSGLNDIFEAQKIEWHEDTGGSSHHHHH

HG*.

SUMO-peptide fusions for ITC and BLI
SUMO only (empty)
                                (SEQ ID NO: 53)
MAGGLNDIFEAQKIEWHEDTGGSSHHHHHHGSGSGSDSEV

NQEAKPEVKPEVKPETHINLKVSDGSSEIFFKIKKTTPLR

RLMEAFAKRQGKEMDSLTFLYDGIEIQADQTPEDLDMEDN

DIIEAHREQIGG*.

SUMO-ActA
                                (SEQ ID NO: 54)
MAGGLNDIFEAQKIEWHEDTGGSSHHHHHHGSGSGSDSEV

NQEAKPEVKPEVKPETHINLKVSDGSSEIFFKIKKTTPLR

RLMEAFAKRQGKEMDSLTFLYDGIEIQADQTPEDLDMEDN

DIIEAHREQIGGGFNAPATSEPSSFEFPPPPTEDELEIIR

ETASSLDS*.
```

All other peptides used in the experiment were cloned into the C-terminus of the following sequence:

```
                                (SEQ ID NO: 55)
    MAGGLNDIFEAQKIEWHEDTGGSSHHHHHHGSGSGS

DSEVNQEAKPEVKPEVKPETHINLKVSDGSSEIFFK

IKKTTPLRRLMEAFAKRQGKEMDSLTFLYDGIEIQA

DQTPEDLDMEDNDIIEAHREQIGGSGSG
    [PEPTIDE SEQUENCE]
```

Peptide sequences inserted after the C-terminus are listed in Tables 1, S2, and S3

```
pMCSG7 constructs:
Constructs used for BLI:
ENAH EVH1
                                (SEQ ID NO: 56)
MHHHHHHSSGVDLGTENLYFQSNAMSEQSICQARAAVMVY

DDANKKWVPAGGSTGFSRVHIYHHTGNNTFRVVGRKIQDH

QVVINCAIPKGLKYNQATQTFHQWRDARQVYGLNFGSKED

ANVFASAMMHALEVL*.

VASP EVH1
                                (SEQ ID NO: 57)
MHHHHHHSSGVDLGTENLYFQSNAMSETVICSSRATVMLY

DDGNKRWLPAGTGPQAFSRVQIYHNPTANSFRVVGRKMQP

DQQVVINCAIVRGVKYNQATPNFHQWRDARQVWGLNFGSK

EDAAQFAAGMASALEALE*.

EVL EVH1
                                (SEQ ID NO: 58)
MHHHHHHSSGVDLGTENLYFQSNAMSEQSICQARASVMVY

DDTSKKWVPIKPGQQGFSRINIYHNTASSTFRVVGVKLQD

QQVVINYSIVKGLKYNQATPTFHQWRDARQVYGLNFASKE

EATTFSNAMLFALNIMNSQE*.

EVL EVH1 swapped (residue swapped):
                                (SEQ ID NO: 59)
MHHHHHHSSGVDLGTENLYFQSNAMSEQSICQARASVMVY

DDTSKKWVPAGGQQGFSRINIYHNTASNTFRVVGVKLQDQ

QVVINCSIPKGLKYNQATPTFHQWRDARQVYGLNFASKEE

ATTFANAMLFALEIL*.

Constructs used for crystallography:
ENAH EVH1-ABI1
                                (SEQ ID NO: 60)
MHHHHHHSSGVDLGTENLYFQSNAMSEQSICQARAAVMVY

DDANKKWVPAGGSTGFSRVHIYHHTGNNTFRVVGRKIQDH

QVVINCAIPKGLKYNQATQTFHQWRDARQVYGLNFGSKED

ANVFASAMMHALEVLGGSGSGFDDFPPPPPPPPVDYEDEE

AAVVQYNDPYADGDPAW*.

ENAH EVH1-PCARE
                                (SEQ ID NO: 61)
MHHHHHHSSGVDLGTENLYFQSNAMSEQSICQARAAVMVY

DDANKKWVPAGGSTGFSRVHIYHHTGNNTFRVVGRKIQDH

QVVINCAIPKGLKYNQATQTFHQWRDARQVYGLNFGSKED

ANVFASAMMHALEVLGGSGSGAAKSEELSCEMEGNLEHLP

PPPMEVLMDKSFASLES*.

eCPX constructs
All peptide sequences, and the T7-pep
library, were inserted into the
following background:
                                (SEQ ID NO: 70)
MKKIACLSALAAVLAFTAGTSVAGGQSGQSGDYNKN

QYYGITAGPAYRINDWASIYGVVGVGYGKFQTTEYP

TYKHDTSDYGFSYGAGLQFNPMENVALDFSYEQSRI

RSVDVGTWILSVGYRFGSKSRRATSTVTGGYAQSDA

QGQMNKMGGFNLKYRYEEDNSPLGVIGSFTYTEKSR

TASGGGSGGGSDYKDDDDKGGGSGGGSGIPLR

(SEQ ID NO: 62)[PEPTIDE SEQUENCE]

RIARGSGSEQKLISEEDL*
```

Bolded sequences IPLR and RIAR constitute part of the EcoRI and XhoI restriction enzyme sites, respectively.

Peptide sequences are as follows:

| Name | Sequence |
| --- | --- |
| Empty | No peptide inserted |
| ActA | GFNAPATSEPSSFEFPPPPTEDELEIIRETASSLDS (SEQ ID NO: 22) |
| Vinculin | EAFQPQEPDFPPPPPDLEQLRLTDELAPPKPPLPEG (SEQ ID NO: 64) |
| SHIP2 | VGEGSSSDEESGGTLPPPDFPPPPLPDSAIFLPPSL (SEQ ID NO: 65) |
| OLIG3 | HWAGLPCPCTICQMPPPPHLSALSTANMARLSAESK (SEQ ID NO: 66) |
| TRIM1 | ILSGLPAPDFIDYPERQECNCRPQESPYVSGMKTCH* (SEQ ID NO: 67) |

Pre-Enrichment of T7-Pep Library

The T7-pep library was prepared as described above. $7 \times 10^7$ cells expressing the T7-pep library were incubated with a final concentration of 20 μM ENAH tetramer. Cells were sorted on a BDFACS Aria machine. Prior to sorting, a positive (ActA) control and a negative (empty) control were analyzed. A gate to collect cells expressing peptide binders was set that included 0.3% of the negative control and all cells with a greater binding signal, allowing us to enrich moderate-affinity binders. This process was repeated three times on the same day for a total of 300,000 cells. These cells were added to warm SOC+25 μg/mL chloramphenicol and grown at 37° C. overnight. The next day, cells were frozen at −80° C. as glycerol stocks for MassTitr sorting.

MassTitr Sorting Scheme

The pre-enriched T7-Pep Library was induced and prepared as previously described. $7 \times 10^7$ cells were incubated with increasing concentrations of ENAH EVH1 tetramer (30, 12, 4.8, 1.9, 0.77, 0.31, 0.12, 0.049 μM) and then sorted on the BDFACS Aria. Cells were collected in 4 gates that were drawn with boundaries roughly parallel to the binding vs. expression signal slope for a series of positive controls (ActA, SHIP2, Vinculin). A no-peptide negative control (empty) was run to assess the degree of nonspecific binding at the time of sorting. At each concentration of ENAH EVH1 tetramer, cells were sorted for approximately 20 minutes and the number of cells that were collected in each gate was recorded. Enough cells were collected per gate to oversample the library at least 10-fold. Cells were collected in LB+0.2% w/v glucose and then sorted cells were transferred into 10 mL of LB+0.2% w/v glucose, grown at 37° C. overnight, and plasmid DNA was isolated by miniprep the next day. Three replicate Mass-Titr experiments were performed.

Illumina Amplicon Preparation

As described above, sorted pools were grown overnight at 37° C. in LB+0.2% glucose and then miniprepped (Qiagen). Samples collected at a certain gate per concentration of ENAH tetramer were each given a unique barcode/index combination. First, we PCR amplified the variable region of the library with a forward primer (Ngsfwd_1) and a corresponding reverse primer that contains one of 5 6-nucleotide (nt) index sequences for multiplexing (Ngsrev_1_i). 14 cycles of amplification were carried out with Phusion polymerase (NEB) using an annealing temperature of 66° C. The resulting reaction was PCR purified with the Zymo Clean and Concentrate kit (Zymo Research) and eluted with L milliQ water. 200 ng of each reaction was cut with MmeI (NEB) at 37° C. for 1 hour and then the enzyme was heat inactivated at 65° C. for 20 minutes. To the 5' end of 15 μL of digested fragment we ligated a double stranded adapter with matching overhangs using T4 DNA ligase (NEB) at 25° C. for 30 minutes, followed by heat inactivation at 65° C. for 10 minutes. This adapter contains one of 24 5-nt barcodes and the standard Illumina forward primer sequence. The expected ~200 bp band was gel purified with the Zymoclean Gel DNA recovery kit (Zymo Research) and eluted in 17 μL of MilliQ water. 3 μL of this reaction was PCR amplified for 10 cycles with primers Ngsfwd_2 and Ngsrev_2 in a 50 μL reaction at an annealing temperature of 66° C. The 5' and 3' Illumina adapter sequences and the reverse priming sequence were included in this step. The final product was PCR purified and eluted in MilliQ water. The DNA concentration of each pool was measured with the Qubit assay and samples were combined and run in one lane. In total, the multiplexed sample included 32 pools (corresponding to cells collected at each of 8 concentrations in 4 gates)×3 replicates, as well as the pre-enriched input library, for a total of 97 samples distinguished by their barcode/index combination. At each stage of the preparation process, the quality and homogeneity of the amplicon was assessed through Sanger sequencing (Genewiz) and Bioanalyzer. The multiplexed sample was submitted for sequencing on a NextSeq500 instrument using paired end reads.

MassTitr Data Processing

Sequences were demultiplexed and processed with an in-house script. We used the sequencing data to determine the number of clonal cells (i.e. cells displaying the same peptide) that were found in each gate at each concentration. We calculated the clone read frequency in gate j at concentration k as $R_{ijk}/T_{jk}$, where $R_{ijk}$ is the number of raw reads for sequence i in gate j at concentration k, and $T_{jk}$ is the total sequencing reads obtained for the pool corresponding to gate j at concentration k. This read frequency was multiplied by the total number of cells collected in each gate (recorded during the sorting) to calculate the total cell number $C_{ijk}$ in a given gate at each ENAH EVH1 tetramer concentration. This can be used to compute an effective gate position, given the gates collected, using equation 1:

$$\frac{c_{i1k}}{c_{itk}}F1 + \frac{c_{i2k}}{c_{itk}}F2 + \frac{c_{i3k}}{c_{itk}}3 + \frac{c_{i4k}}{c_{itk}}F4 = F_{eff}^{seq,con} \quad (1)$$

where F1, F2, F3, and F4 are the mid y-axis fluorescence values for each gate (with values of 700, 1500, 2500, 4000 respectively) and $c_{itk}$ is the total number of cells across all 4 gates for a given clone, obtained by summing $c_{ijk}$ for j=1-4 at concentration k. $F_{eff}^{seq, con}$ was calculated for each clone across all ENAH tetramer concentrations. If this experiment is performed in such a way such that every peptide-expressing cell is collected and sequenced, then the clones-per-gate information can be used to extract a concentration-dependent signal-vs-concentration curve that can be fit to give an apparent dissociation constant. In our experiment, we collected and sequenced fewer cells, focusing on cells that displayed above-background binding signal, and processed the data to obtain lower-resolution information about binding affinities.

Our data processing was focused on identifying a subset of well-behaved clones, of varying affinities, that we judged to be good candidates for subsequent analysis on binding features. We first removed clones for which we obtained <100 reads across all bins at all concentrations and also clones that did not have a total cell count ($C_{ijk}$) of at least 25 cells in at least four concentrations. A sequence was assigned as an ENAH binder if (1) the clonal population of cells showed a concentration-dependent increase in binding signal in at least two of three replicate experiments, or (2) the displayed peptide contained an FP4 (SEQ ID NO:46) motif and showed concentration-dependent binding in at least one replicate. Among binders identified in this way, clones were further tagged as "high affinity" if they met additional requirements: (1) total cell count of greater than or equal to 80 cells for at least four concentrations, (2) greater than or equal to 10 cells found in binding gates at the lowest three concentrations (0.31 µM, 0.12 µM, 0.049 µM), (3) cells in more than one gate at the highest two concentrations (30 µM, 12 µM), and (4) clone found in at least two replicates. These filters are were chosen, by benchmarking against a few validated binding clones from the screen, to extract a subset of well-behaved clones that we judged likely to be true binders (as proved to be true).

MassTitr Sequence Analysis

The T7-pep library contains many point mutations, frameshifts, and prematurely terminated peptides, in addition to full-length human 36-mers. Consequently, for many hits we identified multiple closely related but non-identical sequences. To analyze trends in our dataset, we collapsed hits that we judged to be variants of the same sequence into one representative sequence, leading to a total of 108 non-redundant sequences. If one of the sequence variants matched exactly with a sequence from the proteome, that sequence was chosen as the representative sequence. Otherwise, the sequence with the most combined total cell counts was chosen for analysis. To compare these sequences to sequences from the pre-enriched input library, we clustered amino-acid sequences from the input library reads using CD-Hit with a sequence identity cut-off of 0.7, which effectively collapsed proteomic sequence variants into one representative sequence.

Identification of Putative Biological Interaction Partners and GO Analysis

To identify putative biological interaction partners among our MassTitr hits we first removed peptides that mapped to a human protein but contained an unnatural FP4 (SEQ ID NO:46) or CXC motif due to frameshift or point mutations. Then we identified those peptides predicted to be intrinsically disordered, using an IUPRED cutoff of >0.4. Finally, we assessed the cytoplasmic localization of fit hits using cellular component terms from QuickGO. Two proteins from our list (NHSL1 and KIAA1522) did not have any associated terms with our search criteria. For these proteins, we manually curated subcellular localizations from the literature and the Human Protein Atlas. For proteins reported to be membrane bound, such as MIA3, we confirmed that the regions we pulled out as hits were cytoplasmic as annotated in Uniprot. GO term enrichments were performed using PANTHER with a Fisher's Exact Test. GO biological process terms with an FDR<0.05 were designated as enriched.

Computational Rosetta Modelling

Input structure: An initial structure for the bidentate modeling pipeline was derived from two separate, peptide bound EVH1-domain structures. Structure 5NC7 includes a short FP4 (SEQ ID NO:46)-containing peptide (chain I) bound to the noncanonical site of the ENAH EVH1 domain (chain D), and the ENAH-ABI1 structure reported in this work provided a model of an FP8 (SEQ ID NO:6) peptide on the canonical site. These two structures were imported into PyMol and superimposed using the structural alignment function, and the FP8 (SEQ ID NO:6) peptide was truncated to be FP4 (SEQ ID NO:46). After verifying that the RMSD for the alignment was low (<0.5 Å), the ENAH EVH1 domain of 5NC7 domain was deleted. The two structures were then merged and exported from PyMol. The resulting PDB contained an EVH1-domain bound to two independent FP4 (SEQ ID NO:46)-containing peptides. The final structure was relaxed using the Rosetta Fast Relax protocol run under the default Rosetta energy function REF2015.

Chain Bridging: The Rosetta Bridge Chain mover, with the standard Rosetta energy function REF2015 with interchain centroid weights (interchain_cen), was used to link the noncanonical- and canonical-site-bound peptides of the seed structure. The insertion motif used for the protocol was "αLX", which specified that the mover should generate backbone coordinates for a loop of length a composed of amino acids derived from any part of Ramachandran space. Starting with α=20, we tested shorter lengths of a until Bridge Chain could no longer find a solution. The FP4 (SEQ ID NO:46) motif seeds were anchored in their starting positions using distance constraints generated using the CoordinateConstraintGenerator mover in RosettaScripts with a strength/deviation parameter of 0.25 arbitrary units. The noncanonical-site peptide required a secondary set of constraints for stability, which bound each of its residues to within several angstroms of residue 45 of the EVH1 chain. The final structure, with the two motifs connected, was then relaxed using the Rosetta Fast Relax protocol run under the default Rosetta energy function REF2015. Because bidentate binding was possible in two different orientations while preserving the polarity of both FP4 (SEQ ID NO:46) motifs as found in the 5nc7 and ENAH-ABI1 structures, this process was done twice, once in each direction.

dTERMen

The dTERMen scoring function and protocol are described in Zhou, et al. (Proc Natl Acad Sci USA 2020 117:1059). The inputs to dTERMen are the backbone coordinates of a structure and a sequence. dTERMen returns a score for the input sequence adopting the input structure, with lower scores as better. Side-chain positions are not modeled explicitly. To score the EVL sequence on the ENAH-PCARE backbone template, we generated pairwise alignments of the EVH1 domains of ENAH and EVL to determine how to map sequence to structure. The EVL EVH1 domains is longer than that of ENAH, so unaligned residues were deleted. Specifically, Lys27 was removed from EVL. We then used dTERMen to score all possible combinations of residue swaps between EVL and ENAH, up to 6 possible positions. Residue swap combinations that led to the minimum energy score were recorded. The best 6 mutations were sufficient to nearly recapitulate the energy score of the native ENAH sequence on the ENAH PCARE template. We also included an I26A mutation based on manual inspect of the ENAH-PCARE[828-848] structure. We cloned, over-expressed and purified this swapped EVL sequence, as described above, to test for binding to PCARE B Plasmids for Cell Culture For experiments in mammalian cells, the following plasmids were used: pLKO.1-Enah shRNA (GE Dharmacon TRCN0000061827, *Homo sapiens* antisense 5'-TTAGAG-GAGTCTCAACAGAGG-3' (SEQ ID NO:68)), pLKO.1-Evl shRNA (Sigma TRCN0000091075, *Mus musculus* antisense 5'-TTGTTCATTTCTTCCATGAGG-3' (SEQ ID NO:69)), and non-targeting pLKO.1 control (a gift from Felicia Goodrum, University of Arizona). GFP, and mouse cDNA sequences for GFP-tagged ENAH, VASP, and EVL (gifts from Frank Gertler, MIT) were sub-cloned into the pCIB lentiviral expression vector (Addgene plasmid #120862) as previously described (Puleo et al. 2019). ENAH EVH1 domain deletion mutant was generated using inverse PCR site-directed mutagenesis of full-length ENAH. All sequences of constructed plasmids were confirmed by Sanger sequencing. mRuby2-Pcare and Mito-mRuby2-Pcare inserts were synthesized (Twist Bioscience) and sub-cloned into a SFFV-promoter lentiviral expression vector.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A pharmaceutical composition comprising an effective amount of an isolated polypeptide comprising or consisting of an amino acid sequence selected from the group consisting of LPPPPMEVLMDKSFASLES (SEQ ID NO:1); NLEHLPPPPMEVLMDKSFASLES (SEQ ID NO:2); and EMEGNLEHLPPPPMEVLMDKSFASLES (SEQ ID NO:3), wherein the amino acid sequence comprises at least one non-natural peptide bond.

2. An isolated polypeptide comprising the amino acid sequence NLEHLPPPPMEVLMDKSFASLESGSGSPPPPPF (SEQ ID NO:4).

3. The pharmaceutical composition of claim 1, wherein the isolated polypeptide is covalently linked to a moiety that facilitates penetration of a mammalian cell.

4. The isolated polypeptide of claim 2, consisting of the amino acid sequence NLEHLPPPPMEVLMDKSFASLESGSGSPPPPPF (SEQ ID NO:4).

5. The isolated polypeptide of claim 2, wherein the isolated polypeptide is 23-60 amino acids long.

* * * * *